United States Patent
Fukushima

(10) Patent No.: US 6,407,836 B1
(45) Date of Patent: *Jun. 18, 2002

(54) OPTICAL ATTENUATOR AND SYSTEM, OPTICAL AMPLIFIER, AND TERMINAL DEVICE EACH HAVING THE OPTICAL ATTENUATOR

(75) Inventor: Nobuhiro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/106,897

(22) Filed: Jun. 30, 1998

(30) Foreign Application Priority Data

Jan. 22, 1998 (JP) .......................................... 10-010144

(51) Int. Cl.$^7$ ................................................ H04J 14/02
(52) U.S. Cl. .................... 359/124; 359/161; 359/177; 359/179; 359/341; 359/337; 359/193; 359/180
(58) Field of Search ................................ 359/161, 193, 359/180, 341, 337, 124, 177, 179

(56) References Cited

U.S. PATENT DOCUMENTS

| | | | | |
|---|---|---|---|---|
| 5,015,057 A | * | 5/1991 | Rumbaugh et al. | 350/96.15 |
| 5,148,233 A | * | 9/1992 | Imamura et al. | 356/243 |
| 5,329,350 A | * | 7/1994 | Wright et al. | 356/218 |
| 5,754,571 A | * | 5/1998 | Endoh et al. | 372/20 |
| 5,808,787 A | * | 9/1998 | Meli et al. | 359/341 |
| 5,825,521 A | * | 10/1998 | Ogawa et al. | 359/161 |
| 5,867,300 A | * | 2/1999 | Onaka et al. | 359/283 |
| 5,872,650 A | * | 2/1999 | Lee et al. | 359/341 |
| 5,889,609 A | * | 3/1999 | Fukushima | 359/280 |
| 5,900,968 A | * | 5/1999 | Srivastava et al. | 359/341 |
| 5,918,166 A | * | 6/1999 | Tsumura | 455/249.1 |
| 5,999,305 A | * | 12/1999 | Fukushima | 359/284 |
| 6,038,357 A | * | 3/2000 | Pan | 359/341 |
| 6,115,157 A | * | 9/2000 | Barnard et al. | 359/124 |
| 6,198,572 B1 | * | 3/2001 | Sugaya et al. | 359/337 |

FOREIGN PATENT DOCUMENTS

| | | |
|---|---|---|
| EP | 0390604 | 10/1990 |
| EP | 0926532 A2 | 6/1999 |
| JP | 56-161520 | 12/1981 |
| JP | 62-113107 | 5/1987 |
| JP | 63-77015 | 4/1988 |
| JP | 01243599 | 9/1989 |
| JP | 02256018 | 10/1990 |
| JP | 8-172233 | 7/1996 |
| JP | 9-236784 | 9/1997 |

* cited by examiner

Primary Examiner—Leslie Pascal
Assistant Examiner—Hanh Phan
(74) Attorney, Agent, or Firm—Staas & Halsey LLP

(57) ABSTRACT

The present invention relates to an optical attenuator comprising first and second attenuator units cascaded on an optical path, and a control circuit connected to the first and second attenuator units. Each of the first and second attenuator units includes a Faraday rotator provided on the optical path. The Faraday rotator generates a Faraday rotation angle given as a function of wavelength. Each of the first and second attenuator units further includes polarizing unit for generating an attenuation determined by the Faraday rotation angle on the optical path. The control circuit, for example, controls the Faraday rotation angle in each of the first and second attenuator units so that a wavelength characteristic of attenuation in the first attenuator unit is substantially canceled by a wavelength characteristic of attenuation in the second attenuator unit. With this configuration, although each Faraday rotator generates a Faraday rotation angle given as a function of wavelength, a wavelength characteristic of total attenuation is substantially flattened by the operation of the control circuit.

36 Claims, 18 Drawing Sheets

FIG. 2
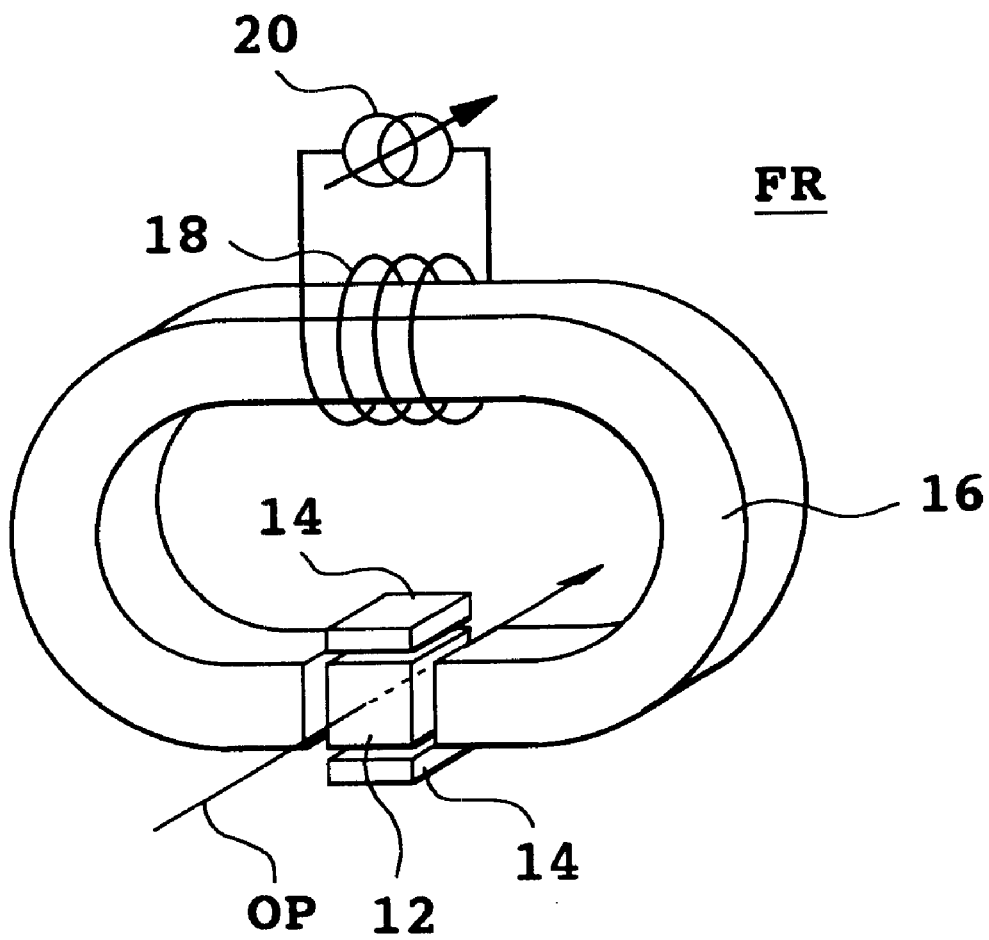
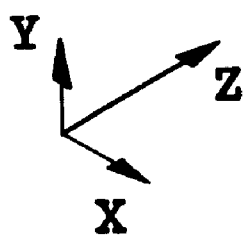

FIG. 8
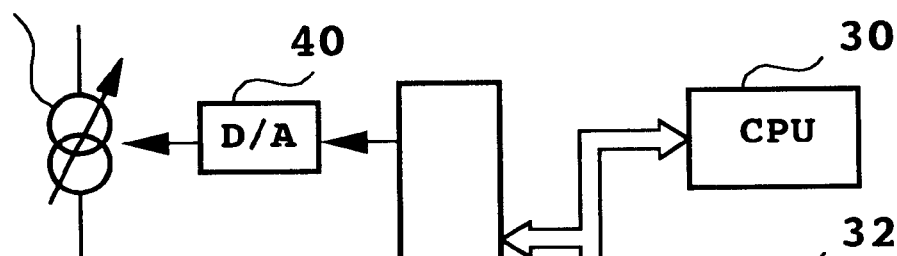
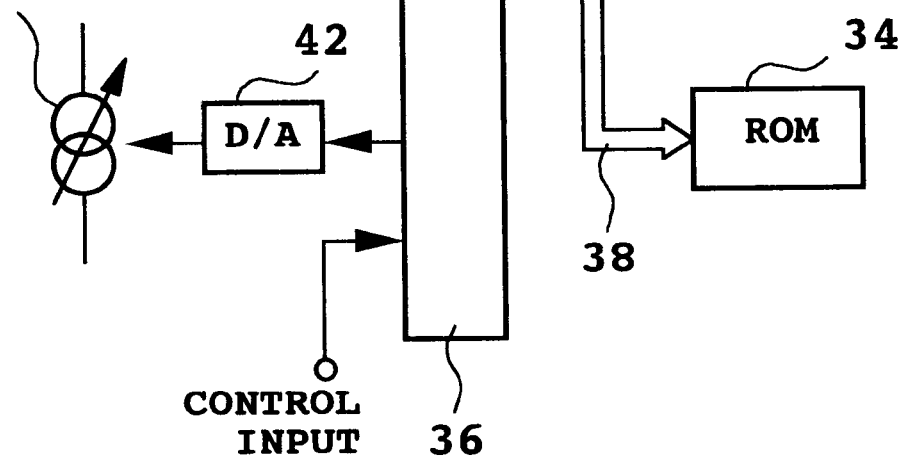

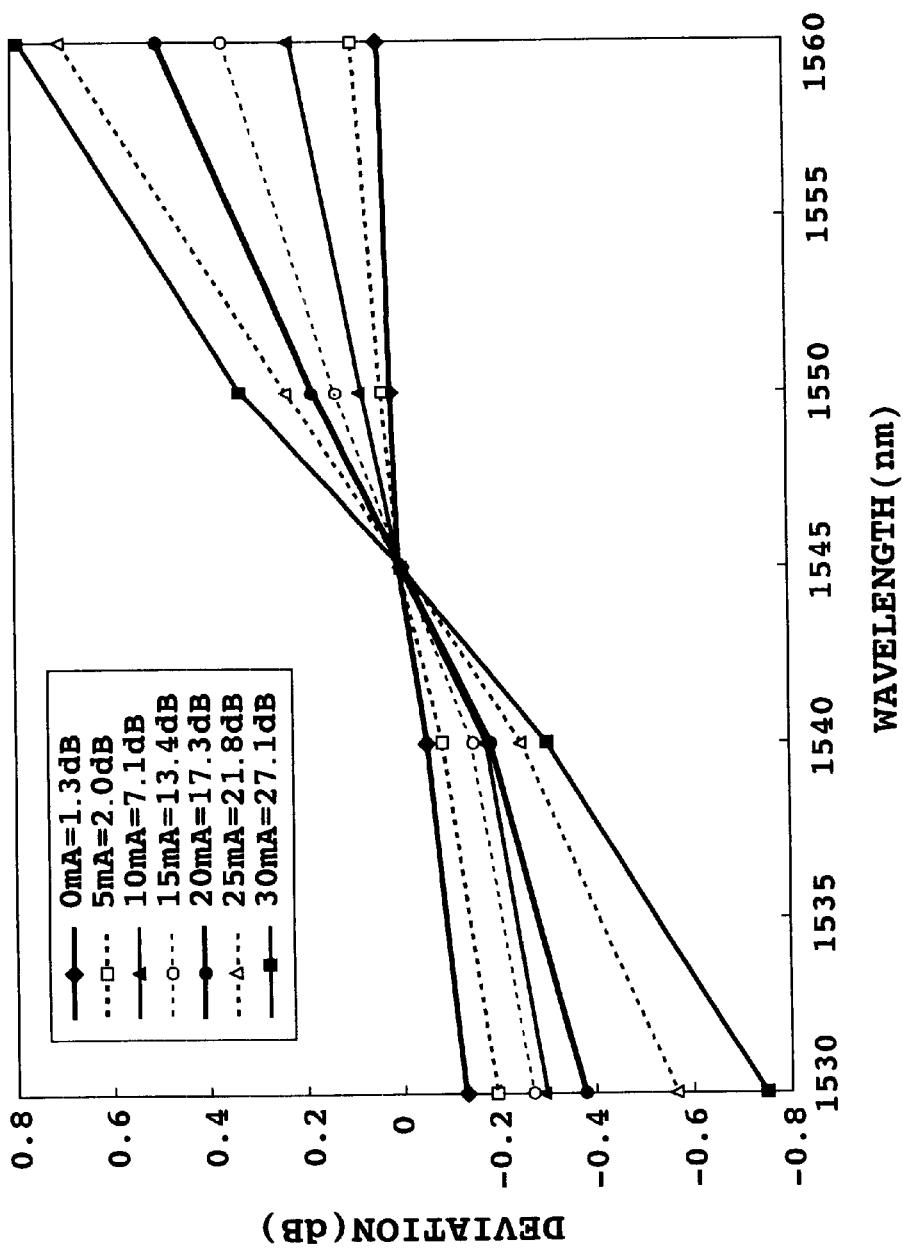

OPTICAL ATTENUATOR AND SYSTEM, OPTICAL AMPLIFIER, AND TERMINAL DEVICE EACH HAVING THE OPTICAL ATTENUATOR

BACKGROUND OF THE INVENTION

1. Field of the Invention

The present invention relates to an optical attenuator having two Faraday rotators, and more particularly to an optical attenuator and a system, optical amplifier, and terminal device each having the optical attenuator.

2. Description of the Related Art

In constructing an optical communication system, there is a case that an optical attenuator is used to adjust the power of light to be supplied to an optical device such as an optical amplifier. In an example of this kind of optical attenuator, attenuation is changed by mechanical operation. For example, an attenuator film having an attenuation distribution is inserted in an optical path, and is mechanically displaced to thereby adjust attenuation.

In some case, it is practically required to incorporate an optical attenuator in a system such that the attenuation by the optical attenuator is controlled. For example, in an erbium-doped fiber amplifier (EDFA), an optical signal once amplified is supplied to an optical attenuator for giving an attenuation feedback-controlled by a monitored value of output level, thereby maintaining a constant output level. In such a case, the use of an optical attenuator whose attenuation is mechanically adjusted is not preferable in improving reliability of the system.

In view of this fact, the present inventor has already proposed a practically excellent optical attenuator having no mechanical movable parts (Japanese Patent Application No. 4-205044, for example). This optical attenuator has a Faraday rotator whose Faraday rotation angle changes with a change in current applied to an electromagnet, and the attenuation is set by adjusting the Faraday rotation angle.

It is desirable that an optical attenuator gives a uniform attenuation to input light irrespective of its wavelength. However, in the case that the Faraday rotator has a wavelength characteristic, i.e., in the case that the Faraday rotation angle changes depending upon wavelength, the attenuation changes according to wavelength, so that the wavelength characteristic of attenuation becomes nonflat. If an optical attenuator having a nonflat wavelength characteristic of attenuation is applied to a wavelength division multiplex system, the attenuations of optical signals become different between channels, causing a problem such as interchannel deviation in signal power.

Further, it is also required that the wavelength characteristic of attenuation of an optical attenuator can be arbitrarily set to cancel gain tilt (a property of change of gain according to wavelength) occurring in an EDFA, for example.

SUMMARY OF THE INVENTION

It is therefore an object of the present invention to provide an optical attenuator having a flat wavelength characteristic of attenuation.

It is another object of the present invention to provide an optical attenuator having an adjustable wavelength characteristic of attenuation.

It is a further object of the present invention to provide a system, optical amplifier, and terminal device each having such an optical attenuator.

In accordance with a first aspect of the present invention, there is provided an optical attenuator comprising first and second attenuator units cascaded on an optical path, and a control circuit connected to the first and second attenuator units. Each of the first and second attenuator units includes a Faraday rotator provided on the optical path. The Faraday rotator generates a Faraday rotation angle given as a function of wavelength. Each of the first and second attenuator units further includes polarizing means for generating an attenuation determined by the Faraday rotation angle on the optical path. Particularly in the optical attenuator according to this aspect of the present invention, the control circuit includes means for controlling the Faraday rotation angle in each of the first and second attenuator units so that a wavelength characteristic of attenuation in the first attenuator unit is substantially canceled by a wavelength characteristic of attenuation in the second attenuator unit.

With this configuration, although each Faraday rotator generates a Faraday rotation angle given as a function of wavelength, a wavelength characteristic of total attenuation is substantially flattened by the operation of the control circuit.

In an optical attenuator in accordance with a second aspect of the present invention, the control circuit includes means for controlling the Faraday rotation angle in each of the first and second attenuator units so that a wavelength characteristic given as the sum of a wavelength characteristic of attenuation in the first attenuator unit and a wavelength characteristic of attenuation in the second attenuator unit has a desired tilt. With this configuration, the wavelength characteristic of total attenuator can be freely adjusted.

In accordance with a third aspect of the present invention, there is provided an optical attenuator comprising first and second attenuator units each for giving a variable attenuation; the first and second attenuator units having first and second wavelength characteristics of attenuation, respectively, which are different from each other.

In accordance with a fourth aspect of the present invention, there is provided a system comprising an optical transmission line for transmitting wavelength division multiplexed light including a plurality of optical signals having different wavelengths; and first and second attenuator units arranged along the optical transmission line, each for giving a variable attenuation; the first and second attenuator units having first and second wavelength characteristics of attenuation, respectively, which are different from each other.

In accordance with a fifth aspect of the present invention, there is provided an optical amplifier comprising a first optical amplifying unit; a second optical amplifying unit; and first and second attenuator units provided between the first and second optical amplifying units, each for giving a variable attenuation; the first and second attenuator units having first and second wavelength characteristics of attenuation, respectively, which are different from each other.

In accordance with a sixth aspect of the present invention, there is provided an optical amplifier comprising an optical amplifying unit; and an optical attenuator connected to an output of the optical amplifying unit; the optical attenuator comprising first and second attenuator units each for giving a variable attenuation; the first and second attenuator units having first and second wavelength characteristics of attenuation, respectively, which are different from each other.

In accordance with a seventh aspect of the present invention, there is provided an optical amplifier comprising an optical amplifying unit; and an optical attenuator connected to an input of the optical amplifying unit; the optical attenuator comprising first and second attenuator units each for giving a variable attenuation; the first and second attenuator units having first and second wavelength characteristics of attenuation, respectively, which are different from each other.

In accordance with an eighth aspect of the present invention, there is provided a terminal device comprising a plurality of E/O converters for respectively outputting optical signals having different wavelengths; a plurality of level adjusting units for respectively adjusting the levels of the optical signals output from the E/O converters; and an optical multiplexer for wavelength division multiplexing the optical signals output from the level adjusting units to obtain wavelength division multiplexed light; each of the level adjusting units comprising first and second attenuator units each for giving a variable attenuation; the first and second attenuator units having first and second wavelength characteristics of attenuation, respectively, which are different from each other.

In accordance with a ninth aspect of the present invention, there is provided a terminal device comprising a plurality of E/O converters for respectively outputting optical signals having different wavelengths; a plurality of level adjusting units for respectively adjusting the levels of the optical signals output from the E/O converters; an optical multiplexer for wavelength division multiplexing the optical signals output from the level adjusting units to obtain wavelength division multiplexed light; and an optical amplifier for amplifying the wavelength division multiplexed light output from the optical multiplexer; the optical amplifier comprising an optical amplifying unit and an optical attenuator connected to the optical amplifying unit; the optical attenuator comprising first and second attenuator units each for giving a variable attenuation; the first and second attenuator units having first and second wavelength characteristics of attenuation, respectively, which are different from each other.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2 is a view showing a preferred embodiment of a Faraday rotator applicable to the present invention;

FIG. 8 is a block diagram showing a preferred embodiment of a control circuit applicable to the present invention;

FIG. 13 is a graph showing measurement results on the wavelength characteristic of attenuation in an attenuator unit shown in FIG. 12;

DETAILED DESCRIPTION OF THE PREFERRED EMBODIMENTS

Figure 1:
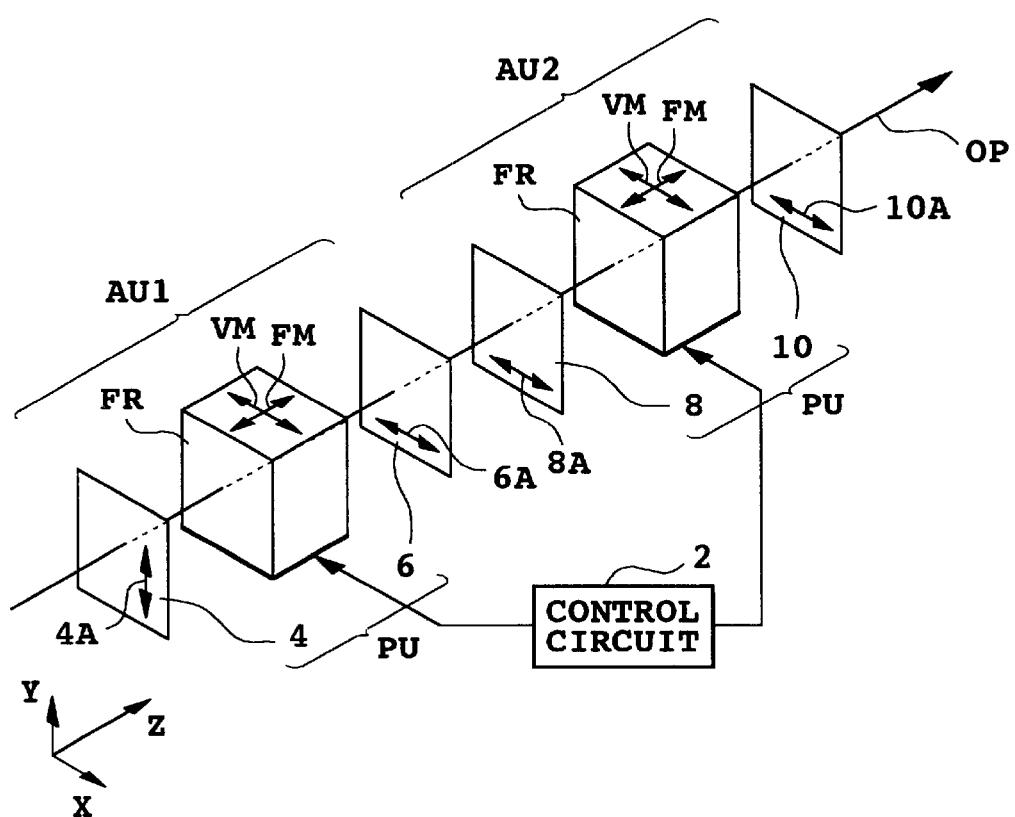
FIG. 1 is a view showing a first preferred embodiment of the optical attenuator according to the present invention.

Some preferred embodiments of the present invention will now be described in detail with reference to the attached drawings. Throughout the drawings, substantially the same parts are denoted by the same reference numerals, and a three-dimensional coordinate system defined by an X axis, Y axis, and Z axis orthogonal to each other is adopted in the case where a direction and others are required to be specified.

FIG. 1 is a view showing a first preferred embodiment of the optical attenuator according to the present invention. This optical attenuator includes two attenuator units AU1 and AU2 cascaded on an optical path OP parallel to the Z axis and a control circuit 2 connected to the units AU1 and AU2. Each of the attenuator units AU1 and AU2 includes a Faraday rotator FR for giving a variable Faraday rotation angle to light propagating along the optical path OP and a polarizing unit PU for generating an attenuation determined by the Faraday rotation angle.

In this preferred embodiment, the polarizing unit PU of the attenuator unit AU1 is composed of polarizers 4 and 6 provided on the optical path OP so as to sandwich the Faraday rotator FR of the attenuator unit AU1, and the polarizing unit PU of the attenuator unit AU2 is composed of polarizers 8 and 10 provided on the optical path OP so as to sandwich the Faraday rotator FR of the attenuator unit AU2. The polarizers 4, 6, 8, and 10 have axes 4A, 6A, 8A, and 10A, respectively, each determining a plane of polarization of linearly polarized light passing therethrough. In this preferred embodiment, the axis 4A is parallel to the Y axis, and the axes 6A, 8A, and 10A are parallel to the X axis.

The operation of the optical attenuator shown in FIG. 1 will first be described in brief. When the Faraday rotation angle given by the Faraday rotator FR of the attenuator unit AU1 is 90°, the attenuation by the attenuator unit AU1 becomes minimum because the axes 4A and 6A are orthogonal to each other. When the Faraday rotation angle given by the Faraday rotator FR of the attenuator unit AU2 is 0°, the attenuation by the attenuator unit AU2 becomes minimum because the axes 8A and 10A are parallel to each other. Accordingly, a total attenuation by this optical attenuator becomes minimum.

In the broad sense, the Faraday rotation angle of 90° includes 90°+n·180° (n is an integer), and the Faraday rotation angle of 0° includes m·180° (m is an integer).

When the Faraday rotation angle given by the Faraday rotator FR of the attenuator unit AU1 is close to 0°, and when the Faraday rotation angle given by the Faraday rotator FR of the attenuator unit AU2 is close to 90°, the total attenuation by this optical attenuator becomes maximum.

Referring to FIG. 2, a specific configuration of each Faraday rotator FR is shown. The Faraday rotator FR shown in FIG. 2 has a magneto-optic crystal 12 provided so that the optical path OP passes therethrough.

In general, when linearly polarized light passes through the magneto-optic crystal 12 in the condition where a certain magnetic field is applied to the magneto-optic crystal 12, i.e., in the condition where the magneto-optic crystal 12 is placed in a certain magnetic field, a polarization direction of the linearly polarized light is rotated always in the same direction irrespective of a propagation direction of the linearly polarized light.

The term of "polarization direction" used herein is defined as a projection of a plane including an electric field vector of the linearly polarized light onto a plane perpendicular to the propagation direction.

This phenomenon that the polarization direction is rotated is called Faraday rotation, and the magnitude of an angle of rotation of the polarization direction (Faraday rotation angle) depends on a direction and strength (magnitude) of magnetization of the magneto-optic crystal 12 generated by the applied magnetic field. More specifically, the Faraday rotation angle is determined by a component of the strength of magnetization of the magneto-optic crystal 12 in the light propagation direction.

Accordingly, it appears that the Faraday rotation angle can be effectively adjusted by using the magneto-optic crystal 12 and means for applying a magnetic field to the crystal 12 in the same direction as the light propagation direction and by adjusting the magnetic field applied. However, it should be considered herein that when the magnitude of the applied magnetic field is relatively small, the magnetization of the magneto-optic crystal 12 by the applied magnetic field does not reach a saturated condition, and many magnetic domains become present in the magneto-optic crystal 12. The presence of such many magnetic domains deteriorates reproducibility of the Faraday rotation angle, or makes it difficult to continuously vary the Faraday rotation angle even though good reproducibility is ensured. Furthermore, when many magnetic domains are present in the magneto-optic crystal 12, attenuation due to light scattering at interfaces between the magnetic domains occurs, causing a disadvantage in practical use.

In this preferred embodiment taking the above circumstances into account, first and second magnetic fields having different directions are applied to the magneto-optic crystal 12, and at least one of the first and second magnetic fields is changed to thereby change a Faraday rotation angle obtained. Further, the first and second magnetic fields are set so that a synthetic magnetic field thereof has a strength enough to saturate the strength of magnetization of the magneto-optic crystal 12. The condition where the strength of magnetization of the magneto-optic crystal 12 has been satisfied can be understood as a condition where the magnetic domains present in the crystal 12 has become a single magnetic domain. By changing at least one of the first and second magnetic fields in the saturated condition of magnetization of the magneto-optic crystal 12, the Faraday rotation angle can be continuously varied to thereby prevent occurrence of loss due to light scattering at interfaces between the magnetic domains. Further, reproducibility of the Faraday rotation angle can also be made satisfactory.

Preferably, the first and second magnetic fields are applied in orthogonal directions in a plane parallel to the optical path OP, so as to allow effective changes of the Faraday rotation angle.

In the preferred embodiment shown in FIG. 2, a pair of permanent magnets 14 are provided so as to be opposed to the upper and lower surfaces of the magneto-optic crystal 12, so as to apply a fixed magnetic field FM (see FIG. 1) parallel to the Z axis to the magneto-optic crystal 12. Further, an electromagnet 16 is provided so as to be opposed to the right and left side surfaces of the magneto-optic crystal 12, so as to apply a variable magnetic field VM (see FIG. 1) parallel to the X axis to the magneto-optic crystal 12. A coil 18 of the electromagnet 16 is connected to a variable current source 20. A drive current supplied to the electromagnet 16 is adjusted by the variable current source 20, thereby changing the direction of magnetization of the magneto-optic crystal 12 and accordingly changing the Faraday rotation angle.

Examples of the magneto-optic crystal 12 include a thin slice of YIG (Yttrium Iron Garnet) and an epitaxially grown crystal of $(GdBi)_3(FeAlGa)_5O_{12}$.

The reason why the fixed magnetic field FM is applied parallel to the optical path OP and the variable magnetic field VM is applied perpendicularly to the optical path OP in the preferred embodiment shown in FIG. 2 is that application of a magnetic field in a direction perpendicular to the optical path OP is easier than application of a magnetic field in a direction parallel to the optical path OP, and that it is desired to apply the electromagnet 16 complex in configuration to the easier application of a magnetic field.

Figure 3:
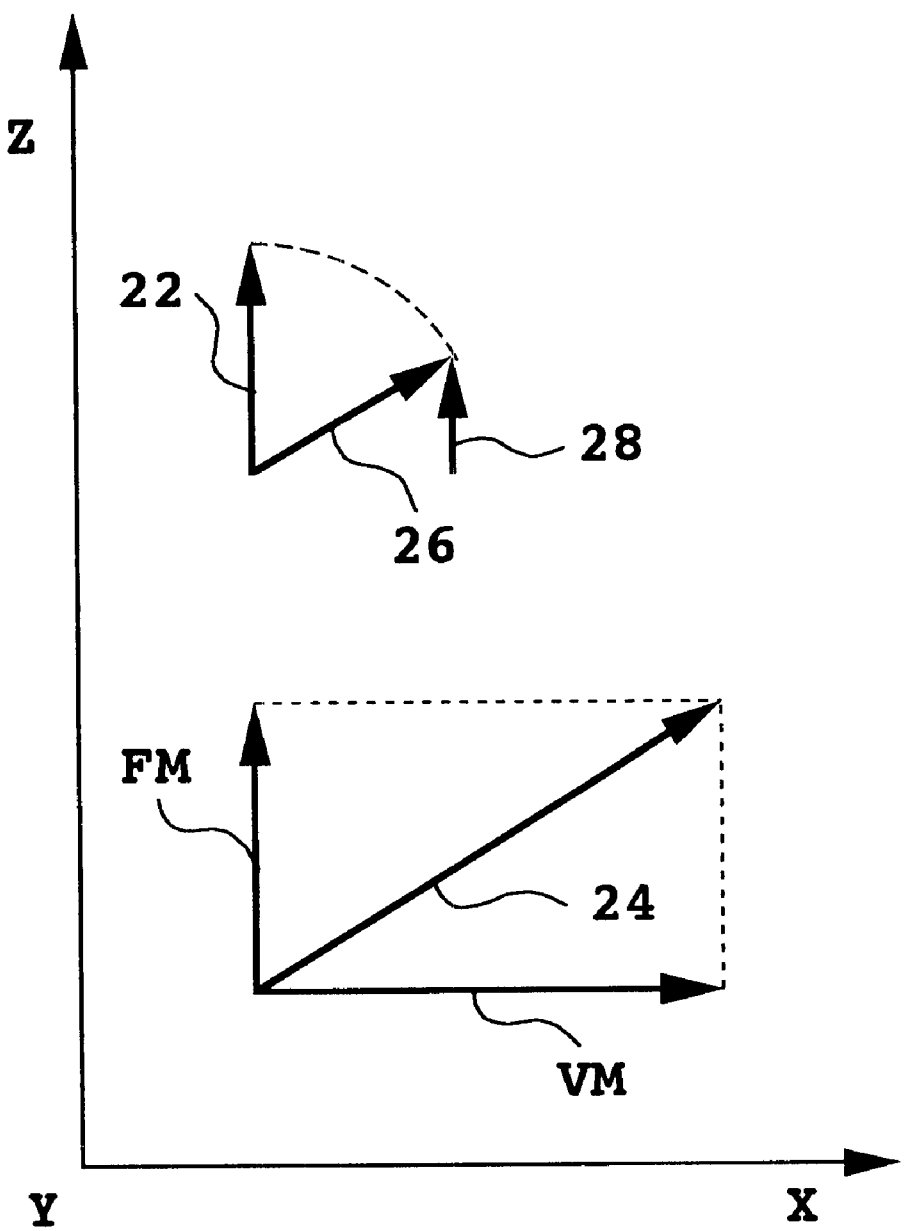
FIG. 3 is a view for illustrating the principle of changing of the Faraday rotation angle in the Faraday rotator shown in FIG. 2.

FIG. 3 is a view for illustrating the principle of changing of the Faraday rotation angle by using the Faraday rotator FR shown in FIG. 2. For vector representation of the direction and strength of the magnetic fields applied to the magneto-optic crystal 12 and of the magnetization of the magneto-optic crystal 12, the vertical axis and the horizontal axis in FIG. 3 correspond to the Z axis and the X axis, respectively.

In the case that the drive current for the electromagnet 16 is substantially zero and that the fixed magnetic field FM is applied to the magneto-optic crystal 12 by the permanent magnet 14 only, the magnetization of the crystal 12 is parallel to the Z axis as shown by reference numeral 22. The strength of the fixed magnetic field FM is set so that the magnetization of the crystal 12 is saturated by the fixed magnetic field FM only. In this preferred embodiment, when the fixed magnetic field FM only is applied, the Faraday rotation angle becomes 90°.

When the variable magnetic field VM is applied parallel to the X axis by the electromagnet 16, the synthetic magnetic field is given as a synthetic vector of the fixed magnetic field FM and the variable magnetic field VM as shown by reference numeral 24. This synthetic magnetic field 24 generates a magnetization as shown by reference numeral 26 in the magneto-optic crystal 12. The direction of the magnetization 26 is parallel to the direction of the synthetic magnetic field 24, and the magnetization of the magneto-optic crystal 12 is saturated. Therefore, the strength of the magnetization 26 (the length of the magnetization vector) is equal to the strength of the magnetization 22 (the length of the magnetization vector).

Although the strength of the magnetization of the magneto-optic crystal 12 is fixed, a degree of contribution of the magnetization to the Faraday rotation angle in the crystal 12 is not the same, because the Faraday rotation angle depends also on the relation between the direction of the magnetization and the light propagation direction. That is, in comparing the condition of the magnetization 22 and the condition of the magnetization 26, a Z-axis component 28 of the w magnetization 26 is smaller than a Z-axis component (the magnetization 22 itself) of the magnetization 22. Accordingly, the Faraday rotation angle corresponding to the magnetization 26 is smaller than that corresponding to the magnetization 22.

More specifically, in the Faraday rotator FR shown in FIG. 2, the Faraday rotation angle is decreased from 90° toward 0° by changing the drive current for the electromagnet 16 from 0 to a maximum value.

Figure 4:
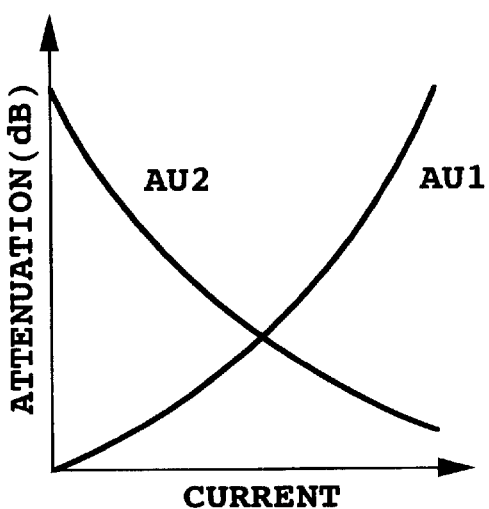
FIG. 4 is a graph showing the relation between attenuation and drive current in each of the two attenuator units shown in FIG. 1.

FIG. 4 is a graph showing the relation between the attenuation and the drive current for the electromagnet 16 in each of the attenuator units AU1 and AU2 shown in FIG. 1. In the attenuator unit AU1, the axes 4A and 6A are perpendicular to each other, and the variable magnetic field VM by the electromagnet 16 is applied in a direction perpendicular to the Z axis. Therefore, the attenuation continuously increases with an increase in the drive current for the electromagnet 16. On the other hand, in the attenuator unit AU2, the axes 8A and 10A are parallel to each other, and the variable magnetic field VM by the electromagnet 16 is applied in a direction perpendicular to the Z axis. Therefore, the attenuation continuously decreases with an increase in the drive current for the electromagnet 16.

There will now be described the principle of flattening of a wavelength characteristic of attenuation by the combination of such two attenuator units AU1 and AU2.

Figure 5:
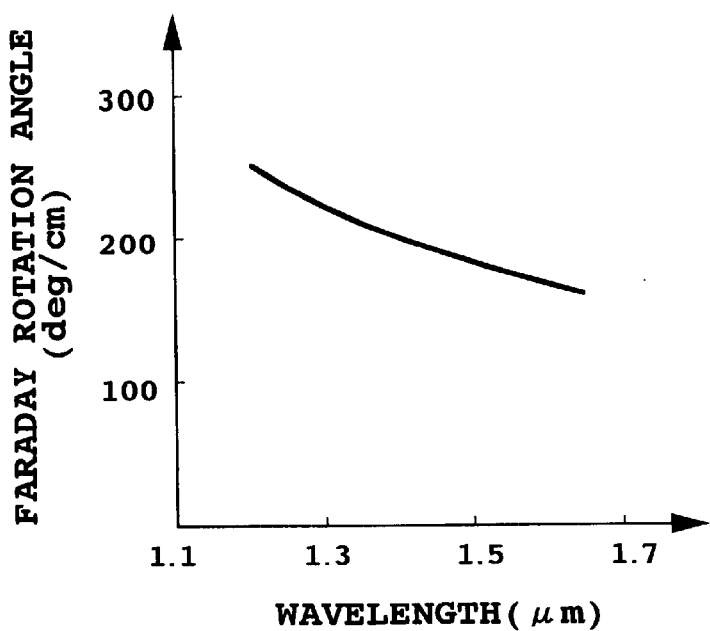
FIG. 5 is a graph showing an example of a wavelength characteristic of Faraday rotation angle.

FIG. 5 is a graph showing an example of a wavelength characteristic of Faraday rotation angle when the magnetization of a certain magneto-optic crystal is saturated. In FIG. 5, the vertical axis represents Faraday rotation angle (deg/cm) and the horizontal axis represents wavelength (μm) of light to which a Faraday rotation angle is given. In this example of magneto-optic crystal, the Faraday rotation angle per unit length decreases with an increase in wavelength.

Figure 6:
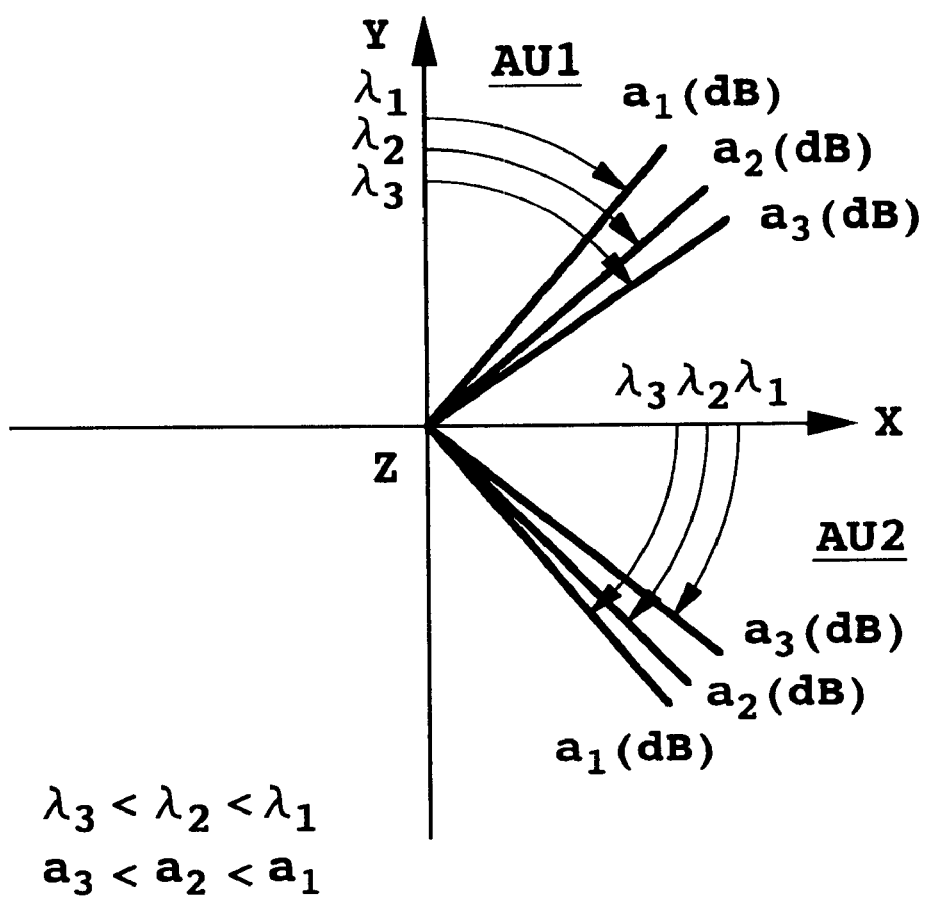
FIG. 6 is a view for illustrating an influence of the wavelength characteristic of each Faraday rotation angle in the optical attenuator shown in FIG. 1.

There will now be described an influence of the wavelength characteristic of each Faraday rotation angle in the optical attenuator show n in FIG. 1 provided that the magneto-optic crystal 12 has such a characteristic as shown in FIG. 5, with reference to FIG. 6. It is assumed that the drive current for the electromagnet 16 is set so that the Faraday rotation angle given to light having a wavelength $\lambda_2$ supplied to the attenuator unit AU1 becomes 45°. In this case, the Faraday rotation angle given to light having a wavelength $\lambda_1$ longer than the wavelength $\lambda_2$ becomes smaller than 45° and the Faraday rotation angle given to light having a wavelength $\lambda_3$ shorter than the wavelength $\lambda_2$ becomes larger than 45°.

In the attenuator unit AU1, the attenuation increases with a decrease in the Faraday rotation angle from 90° toward 0°. Accordingly, letting $a_1$ (dB), $a_2$ (dB), and $a_3$ (dB) denote the attenuations of the lights having the wavelengths $\lambda_1$, $\lambda_2$, and $\lambda_3$, respectively, in the attenuator unit AU1, $a_3 < a_2 < a_1$ holds.

To the contrary, in the attenuator unit AU2, the attenuation decreases with a decrease in the Faraday rotation angle from 90° toward 0°. Accordingly, the attenuations of the lights having the wavelengths $\lambda_1$, $\lambda_2$, and $\lambda_3$ become $a_3$ (dB), $a_2$ (dB), and $a_1$ (dB), respectively, in a substantially linear range of the wavelength characteristic of Faraday rotation angle.

In this manner, in the case that the wavelength characteristic of Faraday rotation angle has a negative tilt as shown in FIG. 5, the attenuation increases with an increase in wavelength in the attenuator unit AU1 whose attenuation increases with an increase in the drive current for the electromagnet 16, whereas the attenuation decreases with an increase in wavelength in the attenuator unit AU2 whose attenuation decreases with an increase in the drive current for the electromagnet 16.

Figure 7A:
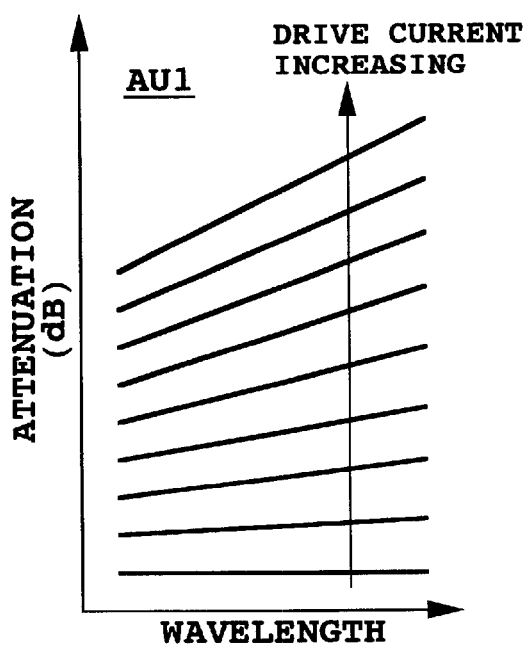
FIGS. 7A and 7B are graphs showing changes in wavelength characteristics of attenuation in the two attenuator units shown in FIG. 1.
Figure 7B:
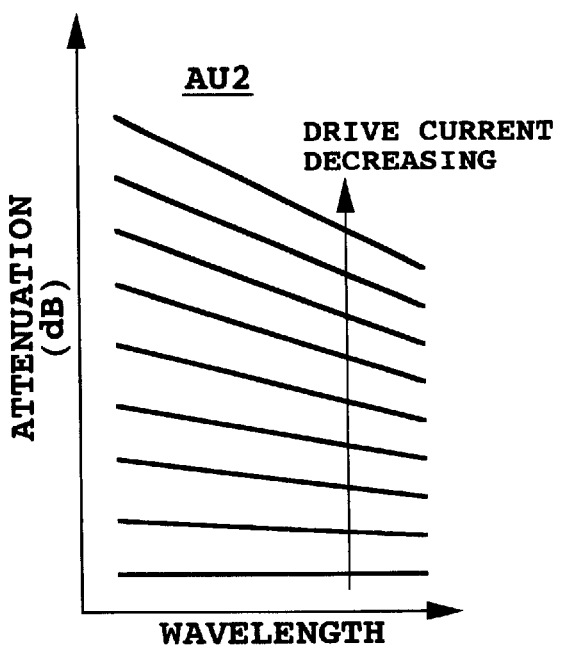

FIGS. 7A and 7B are graphs showing changes in wavelength characteristics of attenuation in the attenuator units AU1 and AU2, respectively. In the attenuator unit AU1, the tendency of the wavelength characteristic of attenuation to tilt positively becomes stronger with an increase in the drive current for the electromagnet 16 as shown in FIG. 7A. On the other hand, in the attenuator unit AU2, the tendency of the wavelength characteristic of attenuation to tilt negatively becomes stronger with an increase in the drive current as shown in FIG. 7B.

Letting $\theta_{F1}$ denote the Faraday rotation angle in the attenuator unit AU1, the attenuation (dB) by the attenuator unit AU1 is given by the following expression.

$$10 \cdot \log[\sin^2 \theta_{F1}]$$

Accordingly, a change in transmitted light power with an increase in wavelength by $\Delta\lambda$ is expressed as follows:

$$-\sin 2\theta_{F1} \sin(K\theta_{F1}\Delta\lambda)$$

where K is a coefficient in the case where primary approximation of the wavelength characteristic of Faraday rotation angle is made.

On the other hand, letting $\theta_{F2}$ denote the Faraday rotation angle in the attenuator unit AU2, the attenuation (dB) by the attenuator unit AU2 is given by the following expression.

$$10 \cdot \log[\sin^2(90° - \theta_{F2})]$$

Accordingly, a change in transmitted light power with an increase in wavelength by $\Delta\lambda$ is expressed as follows:

$$\sin 2\theta_{F2} \sin(K\theta_{F2}\Delta\lambda)$$

Accordingly, a group of combinations of $(\theta_{F1}, \theta_{F2})$ giving the solutions of the following equation provides conditions where the wavelength characteristic of attenuation in the attenuator unit AU1 is substantially canceled by the wavelength characteristic of attenuation in the attenuator unit AU2.

$$\sin 2\theta_{F1} \sin(K\theta_{F1}\Delta\lambda) + \sin 2\theta_{F2} \sin(K\theta_{F2}\Delta\lambda) = 0$$

For example, by controlling the Faraday rotation angle in the attenuator unit AU1 and the Faraday rotation angle in the attenuator unit AU2 under the conditions where the two Faraday rotation angles become substantially equal to each other, the wavelength characteristic of total attenuation in the optical attenuator shown in FIG. 1 can be flattened.

Alternatively, in the case where the total attenuation is relatively large, e.g., in the case where the sum of attenuations above the intersection between the two curves shown in FIG. 4 is the total attenuation, each Faraday rotation angle may be controlled under the condition where the Faraday rotation angle in the attenuator unit AU1 and the Faraday rotation angle in the attenuator unit AU2 are equal to each other, whereas in the case where the total attenuation is relatively small, e.g., in the case where the sum of attenuations below the intersection is the total attenuation, each Faraday rotation angle may be controlled under the condition where the Faraday rotation angle in the attenuator unit AU1 and the Faraday rotation angle in the attenuator unit AU2 are different from each other.

A specific configuration of the control circuit 2 suitable for such flexible control will now be described with reference to FIG. 8.

FIG. 8 is a block diagram showing a preferred embodiment of the control circuit 2. In this preferred embodiment, the control circuit 2 includes a CPU (Central Processing Unit) 30 for performing computation and the like for decision of a drive current for each electromagnet 16 according to a control input for providing a desired attenuation, a RAM (Random Access Memory) 32 for temporarily storing data on the results of computation and the like, a ROM (Read Only Memory) 34 preliminarily storing a program, data, etc. required for the computation, and an I/O port 36 for inputting and outputting data. The CPU 30, the RAM 32, the ROM 34, and the I/O port 36 are interconnected by a data bus 38.

Stored in the ROM 34 is a data table representing the relation between a group of solutions of the afore-mentioned equation previously obtained and attenuations obtained by the solutions. When a desired total attenuation is given by a control input, the solution for obtaining the attenuation is selected by the CPU 30, and the Faraday rotation angles in the attenuator units AU1 and AU2 are set so as to satisfy the solution. More specifically, digital data output from the I/O port 36 are converted into analog control signals by D/A converters 40 and 42, which are next supplied to the variable current sources 20 of the attenuator units AU1 and AU2, respectively. Accordingly, the drive current for each electromagnet 16 is set to carry out combination of the Faraday rotation angles for obtaining the desired attenuation.

For example, in the case of reducing the total attenuation, the electromagnet 16 in the attenuator unit AU1 is driven in a region where the Faraday rotation angle in the attenuator unit AU1 is close to 90°, and the electromagnet 16 in the attenuator unit AU2 is driven in a region where the Faraday rotation angle in the attenuator unit AU2 is close to 0°.

In this manner, according to this preferred embodiment, the control circuit 2 controls each Faraday rotation angle so that the wavelength characteristic of attenuation in the attenuator unit AU1 is substantially canceled by the wavelength characteristic of attenuation in the attenuator unit AU2. Accordingly, the wavelength characteristic of total attenuation can be flattened.

Figure 9:
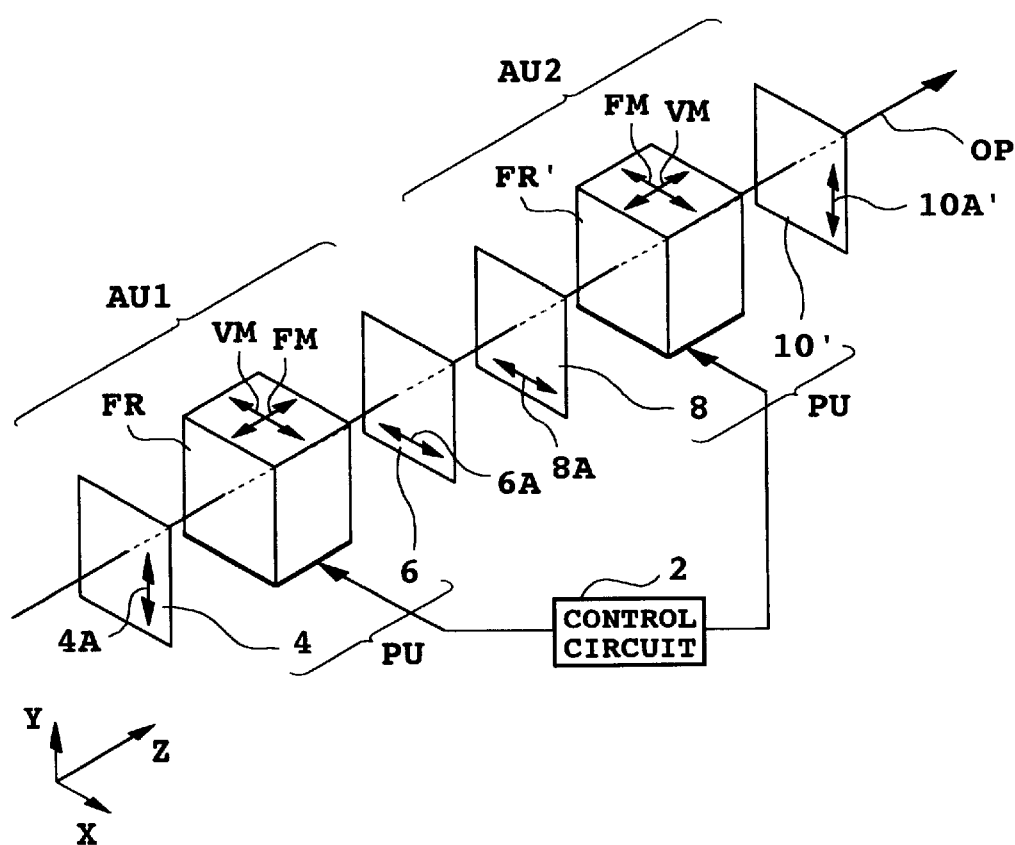
FIG. 9 is a view showing a second preferred embodiment of the optical attenuator according to the present invention.

FIG. 9 is a view showing a second preferred embodiment of the optical attenuator according to the present invention. This preferred embodiment is characterized in that a modified Faraday rotator FR' and polarizer 10' are used in place of the Faraday rotator FR and the polarizer 10 of the attenuator unit AU2 in the first preferred embodiment shown in FIG. 1. Although an internal configuration of the Faraday rotator FR' is not shown, it is modified in such a manner that a variable magnetic field VM is set parallel to the optical path OP and a fixed magnetic field FM is set perpendicular to the optical path OP. Further, the polarizer 10' has an axis 10A' parallel to the Y axis.

Also according to this configuration, the attenuation by the attenuator unit AU2 decreases with an increase in drive current for an electromagnet in the attenuator unit AU2. Accordingly, in accordance with the principle similar to that in the first preferred embodiment shown in FIG. 1, the wavelength characteristic of attenuation in the attenuator unit AU1 is substantially canceled by the wavelength characteristic of attenuation in the attenuator unit AU2, thereby flattening the wavelength characteristic of total attenuation.

Figure 10:
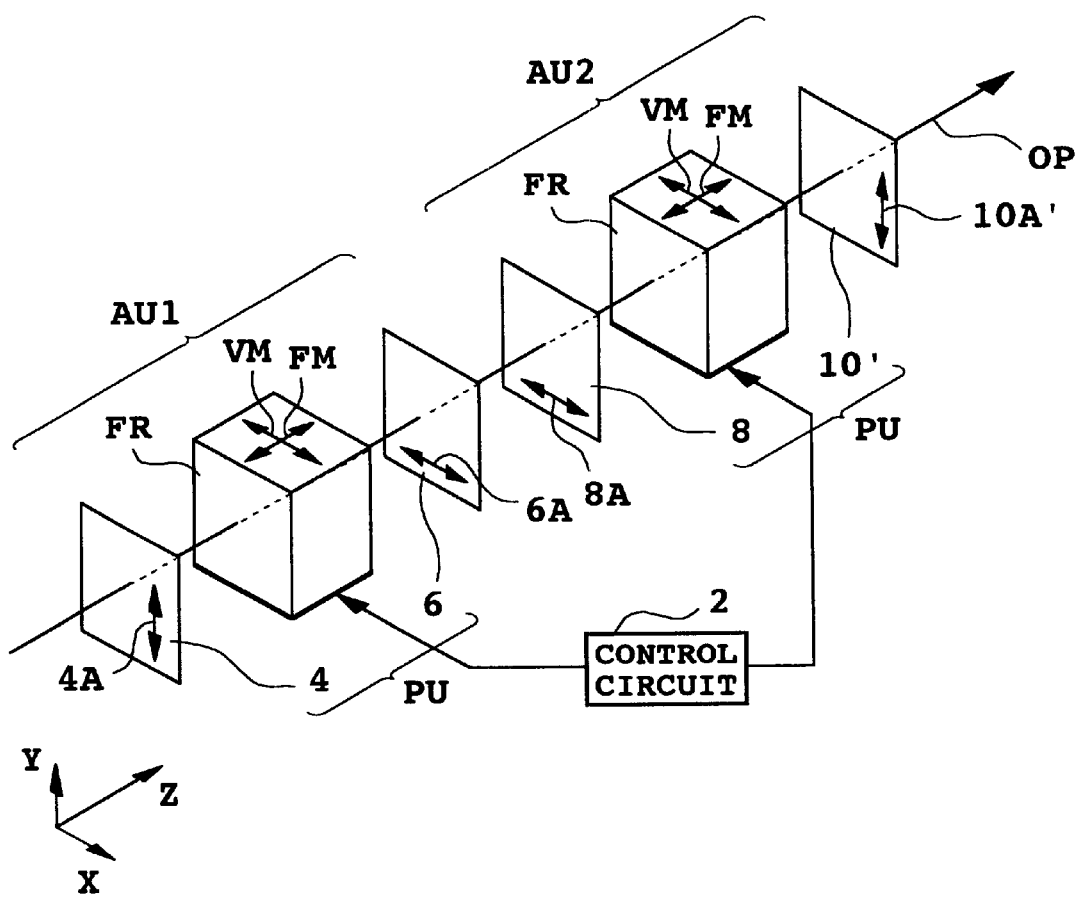
FIG. 10 is a view showing a third preferred embodiment of the optical attenuator according to the present invention.

FIG. 10 is a view showing a third preferred embodiment of the optical attenuator according to the present invention. This preferred embodiment is characterized in that a modified polarizer 10' is used in place of the polarizer 10 of the attenuator unit AU2 in the first preferred embodiment shown in FIG. 1. The polarizer 10' has an axis 10A' parallel to the Y axis. The axes 8A and 10A' are orthogonal to each other, and the axes 4A and 6A are also orthogonal to each other. The Faraday rotators FR in the attenuator units AU1 and AU2 are the same, so that the attenuator units AU1 and AU2 operate similarly.

That is, in each of the attenuator units AU1 and AU2, the attenuation increases with an increase in drive current for the electromagnet 16. Further, in each of the attenuator units AU1 and AU2, the tendency of the wavelength characteristic of attenuation to tilt positively is stronger with an increase in the drive current as shown in FIG. 7A.

Accordingly, by modifying the operation of the control circuit 2, the wavelength characteristic given as the sum of the wavelength characteristic of attenuation in the attenuator unit AU1 and the wavelength characteristic of attenuation in the attenuator unit AU2 can be set so as to have a desired tilt. That is, according to this preferred embodiment, the wavelength characteristic of total attenuation can be easily adjusted. Further, because the two attenuator units AU1 and AU2 operating similarly are cascaded, a dynamic range of adjustment of the wavelength characteristic of total attenuation is widened.

While the polarizers 6 and 8 are shown as separate members in each of the above preferred embodiments for the purpose of ease of understanding of the configurations and operations of the attenuator units AU1 and AU2, any one of the polarizers 6 and 8 may be omitted because the axes 6A and 8A are parallel to each other. Further, in the case that the optical attenuator is used in such a manner that light passes through the attenuator units AU1 and AU2 in this order along the optical path OP and that the light input to the attenuator unit AU1 is linearly polarized light having a polarization plane parallel to the YZ plane, the polarizer 4 may also be omitted.

Some preferred embodiments of the present invention excellent in practical use will now be described. In each of the following preferred embodiments, specific birefringent crystals are combined and optically arranged to thereby prevent attenuation from depending upon a polarization state of input light.

Figure 11:
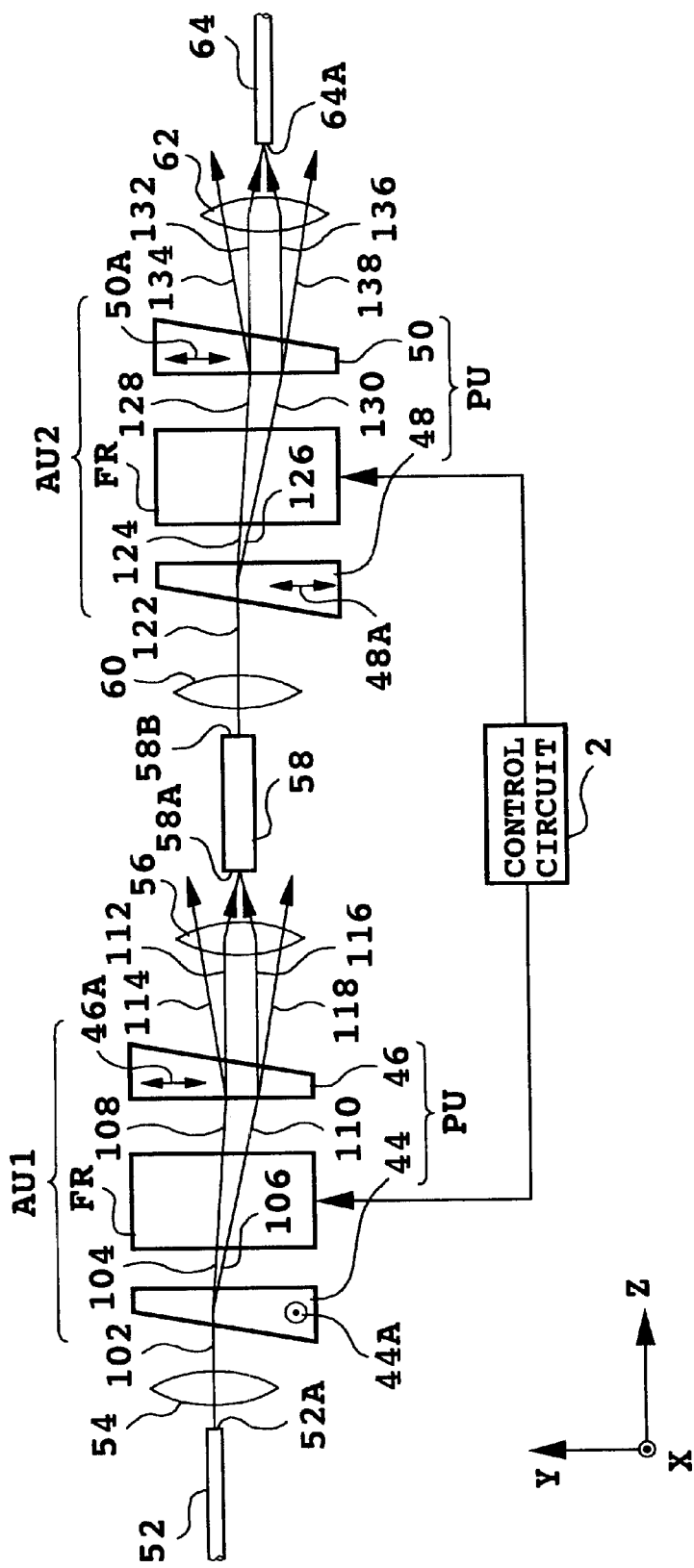
FIG. 11 is a view showing a fourth preferred embodiment of the optical attenuator according to the present invention.

FIG. 11 is a view showing a fourth preferred embodiment of the optical attenuator according to the present invention. This preferred embodiment is characterized in that wedge plates 44, 46, 48, and 50 of birefringent crystals are provided in place of the polarizers 4, 6, 8, and 10 shown in FIG. 1. Additionally provided are an optical fiber 52 and a lens 54 each for an input light beam; a lens 56, an optical fiber 58, and a lens 60 each for optically coupling attenuator units AU1 and AU2; and a lens 62 and an optical fiber 64 each for an output light beam. An optical path connecting the optical fibers 52 and 58 is provided by an ordinary ray and an extraordinary ray defined in each of the wedge plates 44 and 46, and an optical path connecting the optical fibers 58 and 64 is provided by an ordinary ray and an extraordinary ray defined in each of the wedge plates 48 and 50.

With this configuration, attenuation in the optical path connecting the optical fibers 52 and 58 is determined by the Faraday rotation angle in the Faraday rotator FR of the attenuator unit AU1, and attenuation in the optical path connecting the optical fibers 58 and 64 is determined by the Faraday rotation angle in the Faraday rotator FR of the attenuator unit AU2. Accordingly, the output optical fiber 64 is optically coupled to the input optical fiber 52 with a coupling efficiency according to each Faraday rotation angle, thereby obtaining a desired total attenuation.

Each of the wedge plates 44 and 46 has a wedge angle defined on a first plane, and each of the wedge plates 48 and 50 has a wedge angle defined on a second plane. In this preferred embodiment, the first and second planes are parallel to the YZ plane.

The wedge plates 44 and 46 have principal axes 44A and 46A, respectively, each for determining an ordinary ray and an extraordinary ray. Similarly, the wedge plates 48 and 50 have principal axes 48A and 50A, respectively, each for determining an ordinary ray and an extraordinary ray. In this preferred embodiment, the principal axis 44A is parallel to the X axis, and the principal axes 46A, 48A, and 50A are parallel to the Y axis.

The wedge plates 44 and 46 have the same shape and they are arranged in such a manner that a top portion and a bottom portion of the wedge plate 44 are opposed to a bottom portion and a top portion of the wedge plate 46, respectively, and that corresponding surfaces of the wedge plates 44 and 46 are parallel to each other. Similarly, the wedge plates 48 and 50 have the same shape and they are arranged in such a manner that a top portion and a bottom portion of the wedge plate 48 are opposed to a bottom portion and a top portion of the wedge plate 50, respectively, and that corresponding surfaces of the wedge plates 48 and 50 are parallel to each other.

Light emerging from a fiber end 52A of the optical fiber 52 is collimated by the lens 54 to become a parallel light beam. This beam is denoted by reference numeral 102 with the beam thickness neglected. The beam 102 is separated into a beam 104 corresponding to the ordinary ray and a beam 106 corresponding to the extraordinary ray in the wedge plate 44. The beams 104 and 106 undergo Faraday rotation by the same Faraday rotation angle in the same direction in the Faraday rotator FR to become beams 108 and 110, respectively. The beam 108 is separated into a beam 112 corresponding to the ordinary ray and a beam 114 corresponding to the extraordinary ray in the wedge plate 46. The beam 110 is separated into a beam 116 corresponding to the extraordinary ray and a beam 118 corresponding to the ordinary ray in the wedge plate 46.

In considering the history of refractions in the past of the beams 112, 114, 116, and 118 and the shape and arrangement of the wedge plates 44 and 46, the beams 112 and 116 are parallel to each other and the beams 114 and 118 are not parallel to each other. Accordingly, the beams 112 and 116 parallel to each other can be focused by the lens 56 to enter a fiber end 58A of the optical fiber 58. On the other hand, the beams 114 and 118 not parallel to each other are deviated from the optical path and do not enter the fiber end 58A.

The attenuation in the attenuator unit AU1 corresponds to the ratio of the total power of the beams 112 and 116 to the power of the beam 102. For example, in the case that the Faraday rotation angle of the Faraday rotator FR in the attenuator unit AU1 is 90°, the power of the beam 104 is entirely shifted to the power of the beam 112 in principle, and the power of the beam 106 is entirely shifted to the power of the beam 116 in principle. Accordingly, the attenuation in the attenuator unit AU1 is minimized. In the case that the Faraday rotation angle of the Faraday rotator FR is 0°, the power of the beam 104 is entirely shifted to the power of the beam 114 in principle, and the power of the beam 106 is entirely shifted to the power of the beam 118 in principle. Accordingly, the attenuation in the attenuator unit AU1 is maximized. Thus, the attenuation according to the Faraday rotation angle of the Faraday rotator FR is obtained in the attenuator unit AU1.

When the Faraday rotation angle is constant, the total power of the beams 112 and 116 is constant irrespective of the polarization state of the beam 102. Accordingly, the attenuation in the attenuator unit AU1 is not dependent on the polarization state of the beam 102 (i.e., input beam).

The light entered the fiber end 58A of the optical fiber 58 emerges from another fiber end 58B of the optical fiber 58 and is next collimated by the lens 60 to become a parallel light beam. This beam is denoted by reference numeral 122 with the beam thickness neglected. The beam 122 is separated into a beam 124 corresponding to the ordinary ray and a beam 126 corresponding to the extraordinary ray in the wedge plate 48. The beams 124 and 126 undergo Faraday rotation by the same Faraday rotation angle in the same direction in the Faraday rotator FR of the attenuator unit AU2 to become beams 128 and 130, respectively. The beam 128 is separated into a beam 132 corresponding to the ordinary ray and a beam 134 corresponding to the extraordinary ray in the wedge plate 50. The beam 130 is separated into a beam 136 corresponding to the extraordinary ray and a beam 138 corresponding to the ordinary ray in the wedge plate 50.

In considering similarly to the attenuator unit AU1, the beams 132 and 136 enter a fiber end 64A of the optical fiber 64, and the beams 134 and 138 are deviated from the optical path and do not enter the fiber end 64A.

As in the attenuator unit AU1, the attenuation in the attenuator unit AU2 is not dependent on the polarization state of the input beam (beam 122). However, because the principal axes 48A and 50A are parallel to each other in contrast with the fact that the principal axes 44A and 46A are perpendicular to each other, the tendency of the attenuation to change with a change in the Faraday rotation angle in the attenuator unit AU2 is reverse to that in the attenuator unit AU1.

For example, in the case that the Faraday rotation angle in the attenuator unit AU2 is 90°, the power of the beam 124 is entirely shifted to the power of the beam 134 in principle, and the power of the beam 126 is entirely shifted to the power of the beam 138 in principle. Accordingly, the attenuation in the attenuator unit AU2 is maximized. In the case that the Faraday rotation angle in the attenuator unit AU2 is 0°, the power of the beam 124 is entirely shifted to the power of the beam 132 in principle, and the power of the beam 126 is entirely shifted to the power of the beam 136 in principle. Accordingly, the attenuation in the attenuator unit AU2 is minimized.

Accordingly, by operating the control circuit 2 in a manner similar to that in the first preferred embodiment shown in FIG. 1, the wavelength characteristic of attenuation in the attenuator unit AU1 is substantially canceled by the wavelength characteristic of attenuation in the attenuator unit AU2, thereby flattening the wavelength characteristic of total attenuation in the optical attenuator. Thus, according to this preferred embodiment, it is possible to provide an optical attenuator having a flat wavelength characteristic of attenuation and a polarization independence such that the attenuation is not dependent on the polarization state of an input beam.

The use of the optical fiber 58 and the lenses 56 and 60 to optically connect the attenuator units AU1 and AU2 in the fourth preferred embodiment shown in FIG. 11 is due to the following reason. That is, in the case that the attenuator units AU1 and AU2 are optically connected by a spatial beam without using the optical fiber 58 and the lenses 56 and 60, a part or the whole of the powers of the beams 112 and 116 are expected to be shifted to the powers of the beams 132 and 136, whereas the power of the beam 114 or 118 deviated from the optical path may be shifted to the powers of the beams 132 and 136, so that a required attenuation cannot possibly be obtained. Such undesired recombination is caused primarily by the fact that the first plane defining the wedge angles of the wedge plates 44 and 46 is parallel to the second plane defining the wedge angles of the wedge plates 48 and 50. Accordingly, by rotating one of the first and second planes relative to the other about the Z axis to thereby make the first and second planes nonparallel to each other, the optical fiber 58 and the lenses 56 and 60 may be omitted to suppress an insertion loss in the optical attenuator. For example, the first and second planes may be made perpendicular to each other. A specific embodiment of this configuration will be described below.

Figure 12:
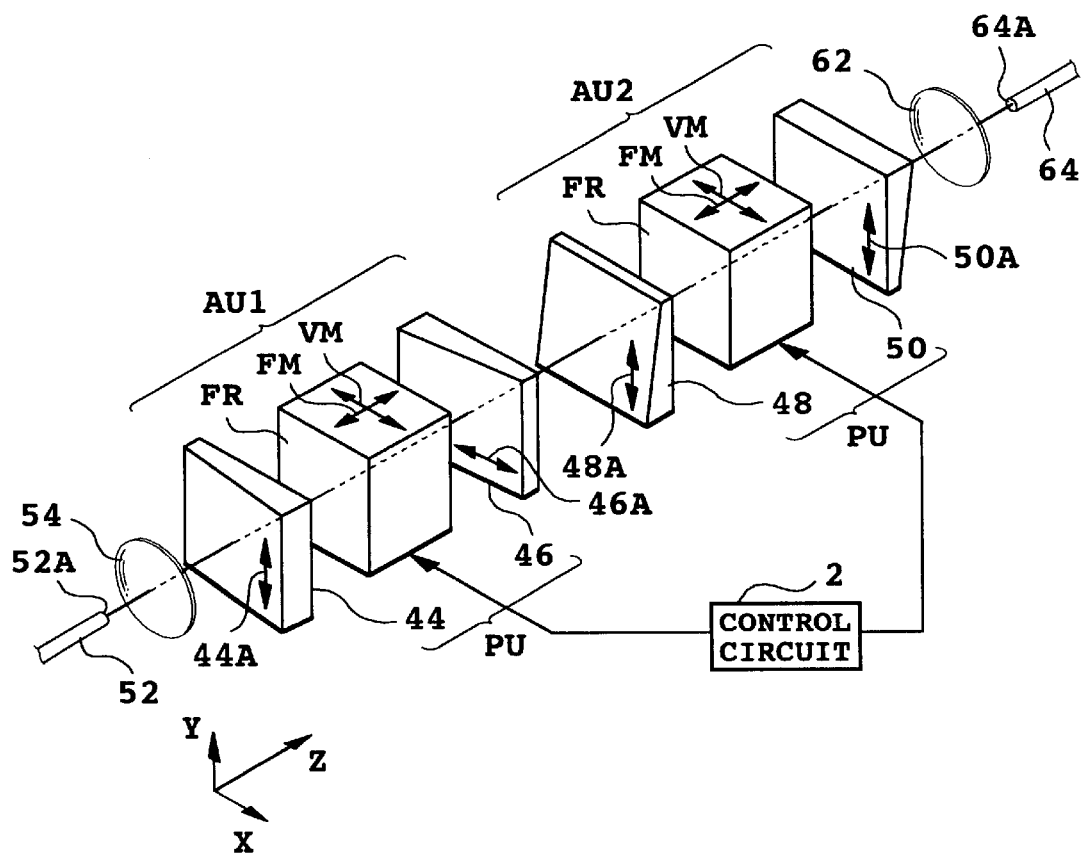
FIG. 12 is a view showing a fifth preferred embodiment of the optical attenuator according to the present invention.

FIG. 12 is a view showing a fifth preferred embodiment of the optical attenuator according to the present invention. In contrast with the fourth preferred embodiment shown in FIG. 11, the fifth preferred embodiment is characterized in that the wedge plates 44 and 46 are rotated 90° about the Z axis to thereby allow omission of the optical fiber 58 and the lenses 56 and 60 shown in FIG. 11. Accordingly, the plane defining the wedge angles of the wedge plates 48 and 50 is parallel to the YZ plane, whereas the plane defining the wedge angles of the wedge plates 44 and 46 is parallel to the XZ plane. Further, the principal axis 44A is parallel to the Y axis, and the principal axis 46A is parallel to the X axis.

The detail of the operating principle of the optical attenuator including the fact that the attenuation in each of the attenuator units AU1 and AU2 is determined by each Faraday rotation angle will be understandable in accordance with the operating principle in the fourth preferred embodiment shown in FIG. 11, so the description thereof will be omitted herein.

Also according to the fifth preferred embodiment shown in FIG. 12, it is possible to provide an optical attenuator having a flat wavelength characteristic of attenuation and a polarization independence such that the attenuation is not dependent on the polarization state of an input beam. Further, according to the fifth preferred embodiment shown in FIG. 12, an insertion loss in the optical attenuator can be reduced by the omission of the optical fiber 58 and the lenses 56 and 60 used in the fourth preferred embodiment shown in FIG. 11.

FIG. 13 is a graph showing measurement results on the wavelength characteristic of attenuation in the attenuator unit AU1 shown in FIG. 12. In FIG. 13, the vertical axis represents deviation (dB) of attenuation, and the horizontal axis represents wavelength (nm). In the attenuator unit AU1, the principal axes 44A and 46A are perpendicular to each other. Accordingly, as the drive current for the electromagnet 16 of the Faraday rotator FR (see FIG. 2) is increased from 0, the Faraday rotation angle obtained is decreased from 90° toward 0° Therefore, the attenuation is expected to increase with an increase in the drive current. Under the conditions where the drive current was set to 0 mA, 5 mA, 10 mA, 15 mA, 20 mA, 25 mA, and 30 mA, the attenuations to a wavelength of 1545 nm at these set values were measured to obtain 1.3 dB, 2.0 dB, 7.1 dB, 13.4 dB, 17.3 dB, 21.8 dB, and 27.1 dB, respectively. Further, it was found that the positive tilt of the wavelength characteristic of attenuation is gradually increased with an increase in the drive current. This measurement result coincides with the wavelength characteristic of attenuation previously described with reference to FIG. 7A.

Although not shown, it was also found that in the attenuator unit AU2 shown in FIG. 12, the wavelength characteristic reverse to the wavelength characteristic shown in FIG. 13 is obtained.

FIGS. 14A to 14D are graphs showing measurement results on the wavelength characteristic of total attenuation in the optical attenuator in the preferred embodiment shown in FIG. 12. In each case, the wavelength characteristic of total attenuation was measured by inputting light from an LED as a substantially white light source in a given wavelength band (1530 nm to 1560 nm) to the optical attenuator and inputting output light from the optical attenuator to an optical spectrum analyzer.

Figure 14A:
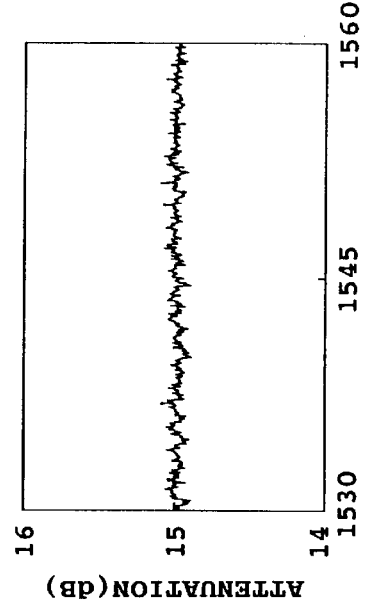
FIGS. 14A to 14D are graphs showing measurement results on the wavelength characteristic of total attenuation in the optical attenuator shown in FIG. 12.

FIG. 14A shows a measurement result in the case that the drive current $I_1$ in the attenuator unit AU1 was set to 10.5 mA and the drive current $I_2$ in the attenuator unit AU2 was set to 7.9 mA. As apparent from FIG. 14A, the attenuation obtained is 10 dB over the given wavelength band, and the wavelength characteristic of attenuation is sufficiently flat.

Figure 14B:
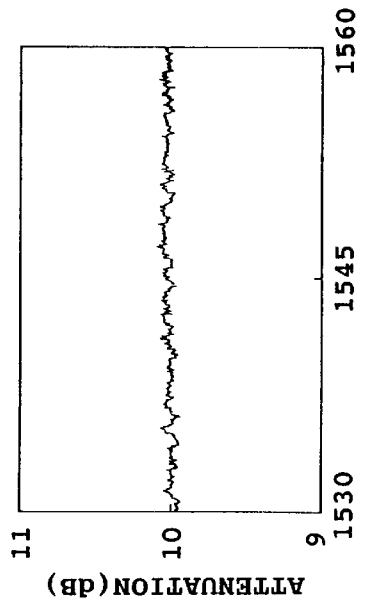

FIG. 14B shows a measurement result in the case that $I_1$=20.0 mA and $I_2$=6.7 mA. As apparent from FIG. 14B, the attenuation obtained is 15 dB over the given wavelength band, and the wavelength characteristic of attenuation is sufficiently flat.

Figure 14C:
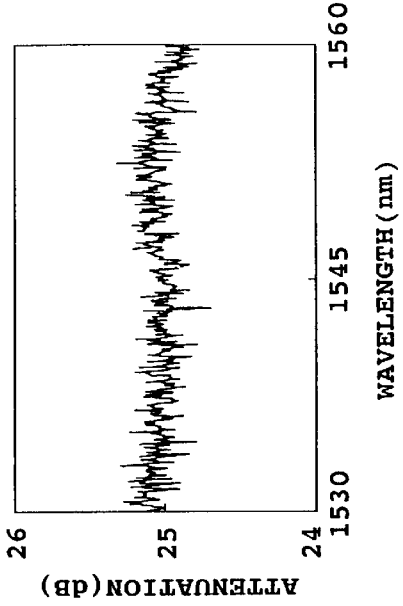

FIG. 14C shows a measurement result in the case that $I_1$=25.8 mA and $I_2$=6.2 mA. As apparent from FIG. 14C, the attenuation obtained is 20 dB over the given wavelength band, and the wavelength characteristic of attenuation is sufficiently flat.

Figure 14D:
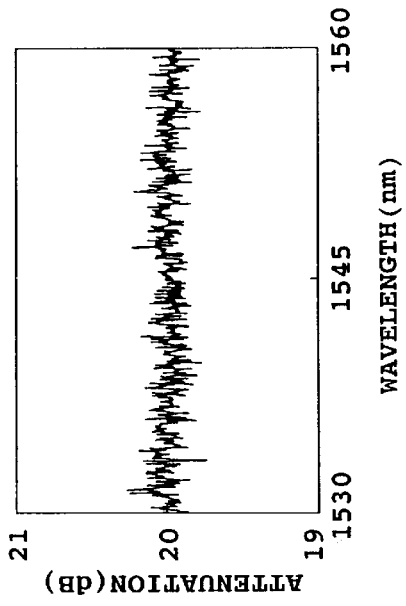

FIG. 14D shows a measurement result in the case that $I_1$=29.1 mA and $I_2$=5.5 mA. As apparent from FIG. 14D, the attenuation obtained is 25 dB over the given wavelength band, and the wavelength characteristic of attenuation is sufficiently flat.

Figure 15:
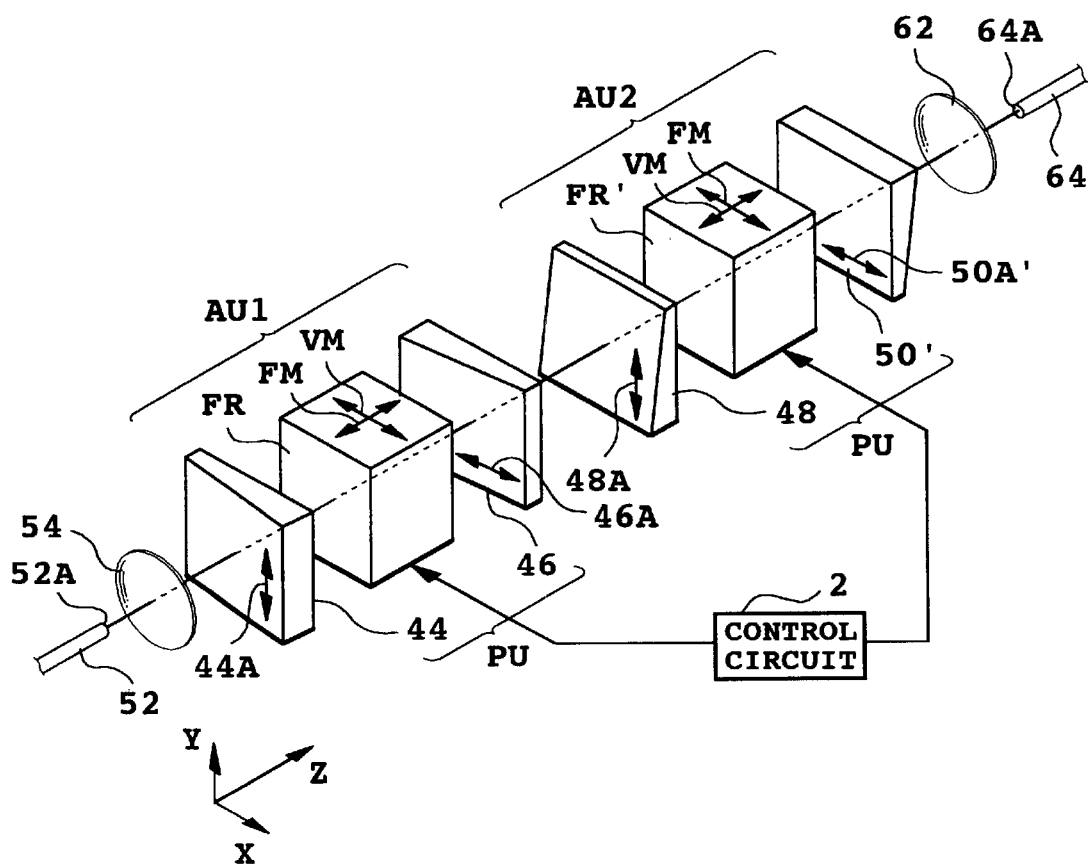
FIG. 15 is a view showing a sixth preferred embodiment of the optical attenuator according to the present invention.

FIG. 15 is a view showing a sixth preferred embodiment of the optical attenuator according to the present invention. In the Faraday rotator FR of the attenuator unit AU2 in the fifth preferred embodiment shown in FIG. 12, the variable magnetic field VM increases with an increase in the drive current, and accordingly the Faraday rotation angle decreases from 90° toward 0°. In contrast therewith, the sixth preferred embodiment shown in FIG. 15 employs a Faraday rotator FR' in which the directions of application of the variable magnetic field VM and the fixed magnetic field FM are reverse to those in the Faraday rotator FR in the fifth preferred embodiment. Accordingly, as the drive current in the Faraday rotator FR' is increased from 0, the Faraday rotation angle increases from 0° toward 90°.

Further, the sixth preferred embodiment shown in FIG. 15 employs a wedge plate 50' having a principal axis 50A' orthogonal to the principal axis 48A of the wedge plate 48. The principal axis 50A' is parallel to the X axis.

In this modified attenuator unit AU2, when the drive current in the Faraday rotator FR' is 0, the Faraday rotation angle is 0° and the attenuation in the attenuator unit AU2 is maximum. As the drive current is increased, the Faraday rotation angle increases toward 90°, and the attenuation in the attenuator unit AU2 accordingly decreases.

According to the sixth preferred embodiment shown in FIG. 15, it is possible to provide an optical attenuator having a flat wavelength characteristic of attenuation and a polarization independence such that the attenuation is not dependent on the polarization state of an input beam as understood in accordance with the principles of the second preferred embodiment shown in FIG. 9 and the fifth preferred embodiment shown in FIG. 12.

Figure 16:
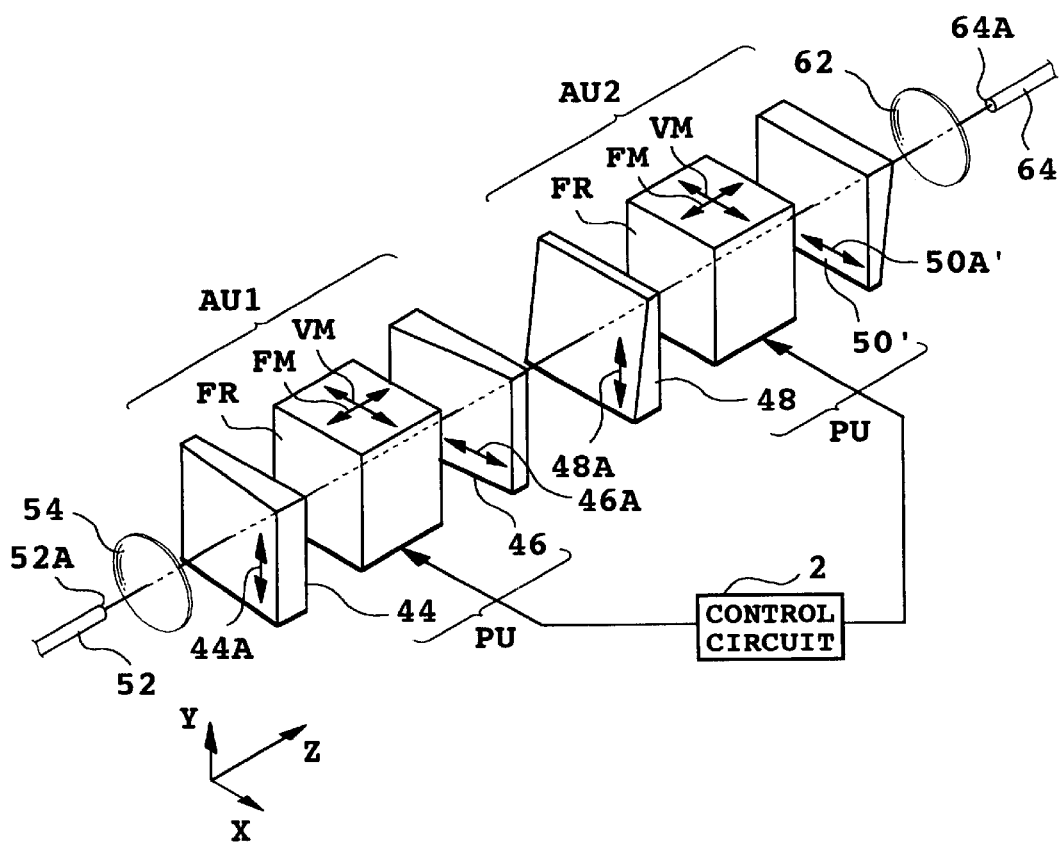
FIG. 16 is a view showing a seventh preferred embodiment of the optical attenuator according to the present invention.

FIG. 16 is a view showing a seventh preferred embodiment of the optical attenuator according to the present invention. In contrast with the fifth preferred embodiment shown in FIG. 12 using the wedge plate 50 having the principal axis 50A parallel to the Y axis, the seventh preferred embodiment shown in FIG. 16 uses a wedge plate 50' having a principal axis 50A' parallel to the X axis.

According to this preferred embodiment, the wavelength characteristic of attenuation in the attenuator unit AU1 and the wavelength characteristic of attenuation in the attenuator unit AU2 have the same tendency. Accordingly, as understood in accordance with the operating principles of the third preferred embodiment shown in FIG. 10 and the fifth preferred embodiment shown in FIG. 12, it is possible to provide an optical attenuator having a freely adjustable wavelength characteristic of attenuation and a polarization independence such that the attenuation is not dependent on the polarization state of an input beam.

While a plurality of wedge plates of birefringent crystals are combined in each of the fourth to seventh preferred embodiments mentioned above to allow the provision of a polarization-independent optical attenuator, a plurality of parallel-plane plates of birefringent crystals may be combined to provide a polarization-independent optical attenuator. In this case, a converging beam system is preferably adopted in place of the parallel beam system adopted in the case of the combination of the wedge plates.

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, an optical amplifier for amplifying signal light has been proposed or put to practical use.

An optical amplifier known in the art includes an optical amplifying medium to which signal light to be amplified is supplied and means for pumping (exciting) the optical amplifying medium so that the optical amplifying medium provides a gain band including the wavelength of the signal light. For example, an erbium doped fiber amplifier (EDFA) includes an erbium doped fiber (EDF) as the optical amplifying medium and a pumping source for supplying pump light having a predetermined wavelength to the EDF. By preliminarily setting the wavelength of the pump light within a 0.98 $\mu$m band or a 1.48 $\mu$m band, a gain band including a wavelength band of 1.55 $\mu$m can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In the case of incorporating an optical amplifier into a system adopting WDM, a transmission distance is limited by a wavelength characteristic of gain represented by a gain tilt or gain deviation. For example, in an EDFA, it is known that a gain tilt is produced at wavelengths in the vicinity of 1.55 $\mu$m and that this gain tilt changes according to the total input power of signal light into the EDFA and the power of pump light.

Figure 17:
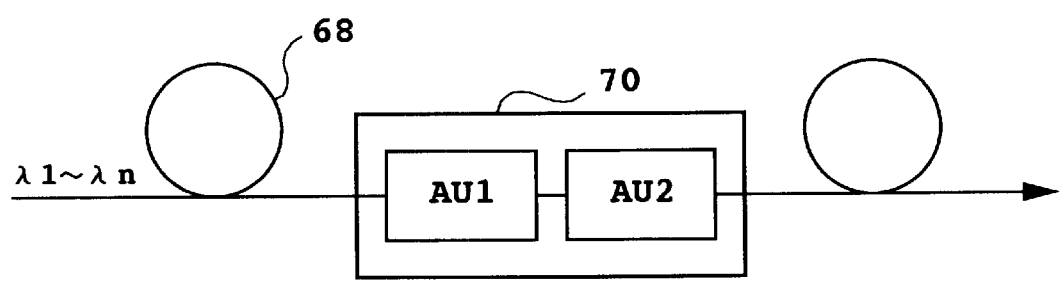
FIG. 17 is a block diagram showing a preferred embodiment of the system according to the present invention.

FIG. 17 is a block diagram showing a preferred embodiment of the system according to the present invention. This system includes an optical fiber transmission line 68 for transmitting wavelength division multiplexed light (WDM light) including a plurality of optical signals having different wavelengths, and an optical attenuator 70 according to the present invention provided in (or arranged along) the optical fiber transmission line 68. The optical attenuator 70 has attenuator units AU1 and AU2 each for giving a variable attenuation to the WDM light. The attenuator units AU1 and AU2 have a first wavelength characteristic of attenuation and a second wavelength characteristic of attenuation, respectively, which are different from each other. The wavelengths of the plural optical signals included in the WDM light are represented by $\lambda_1$ to $\lambda_n$.

In the case that the optical fiber transmission line 68 includes a plurality of in-line optical amplifiers and that each optical amplifier has a wavelength characteristic of gain in the band of the WDM light, the wavelength characteristic of gain is accumulated to cause an interchannel deviation in signal power or optical signal-to-noise ratio (optical SNR).

In the preferred embodiment shown in FIG. 17, the wavelength characteristic of attenuation provided by the optical attenuator 70 can be freely adjusted by configuring the optical attenuator 70 according to the second aspect of the present invention. Accordingly, the cumulative wavelength characteristic of attenuation can be compensated to thereby reduce the interchannel deviation in signal power or optical SNR.

In another system carefully controlled so that the wavelength characteristic of gain in the optical fiber transmission line 68 becomes flat, the wavelength characteristic of attenuation in the attenuator unit AU1 and the wavelength characteristic of attenuation in the attenuator unit AU2 may be substantially canceled by each other to maintain the flat wavelength characteristic of gain under control by configurating the optical attenuator 70 according to the first aspect of the present invention.

Figure 18A:
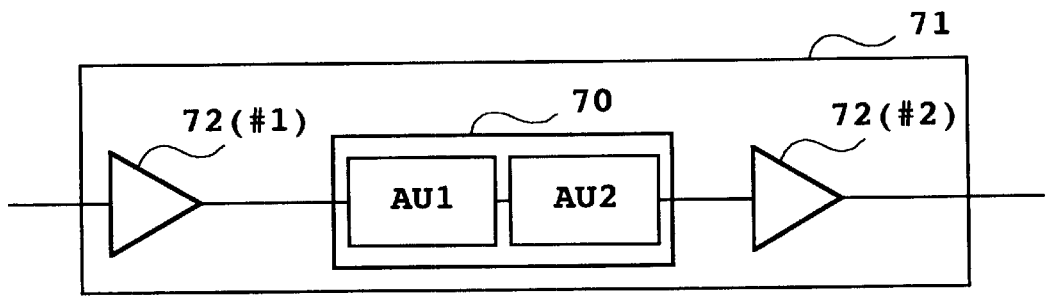
FIGS. 18A to 18C are block diagrams showing preferred embodiments of the optical amplifier according to the present invention.
Figure 18B:
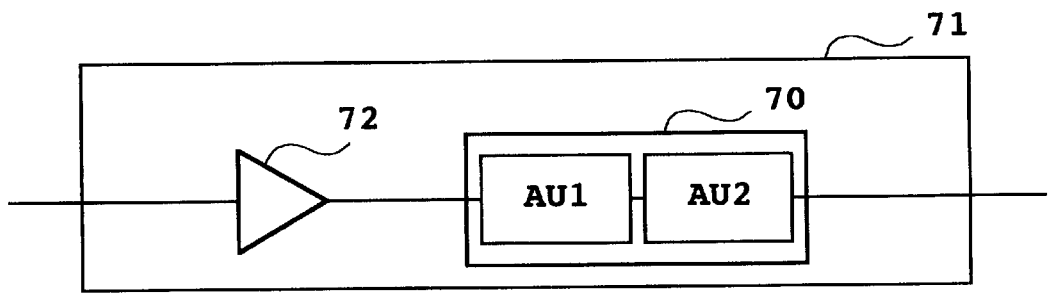
Figure 18C:
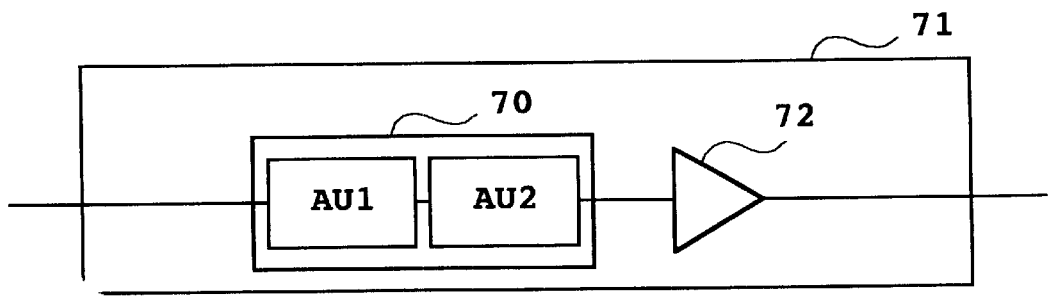

FIGS. 18A, 18B, and 18C are block diagrams showing preferred embodiments of the optical amplifier according to the present invention. The configuration and operation of each optical amplifier will now be described provided that each optical amplifier is applied to the system shown in FIG. 17.

Referring to FIG. 18A, there is shown an optical amplifier 71 including two optical amplifying units 72 (#1 and #2) and an optical attenuator 70 according to the present invention provided between the two optical amplifying units 72 (#1 and #2). The optical attenuator 70 includes two attenuator units AU1 and AU2 each for giving a variable attenuation. The attenuator units AU1 and AU2 have first and second wavelength characteristics of attenuation, respectively, which are different from each other.

WDM light to be amplified is first amplified by the optical amplifying unit 72 (#1), and attenuation is given to the amplified WDM light by the optical attenuator 70. Then, the WDM light attenuated is amplified by the optical amplifying unit 72 (#2) to be finally output from the optical amplifier 71.

In the case that the wavelength characteristic of gain of each of the optical amplifying units 72 (#1 and #2) is to be maintained, the first and second wavelength characteristics of attenuation are set so as to cancel each other.

Alternatively, the first and second wavelength characteristics of attenuation may be set so that the wavelength characteristic of light to be output from the optical amplifying unit 72 (#2) (specifically, the wavelength characteristic of power of WDM light) becomes flat.

Referring to FIG. 18B, there is shown an optical amplifier 71 including an optical amplifying unit 72 and an optical attenuator 70 connected to the output of the optical amplifying unit 72. In this case, the first and second wavelength characteristics of attenuation are set so as to cancel each other so that the wavelength characteristic of gain of the optical amplifying unit 72 is not changed by the operation of the optical attenuator 70.

Referring to FIG. 18C, there is shown an optical amplifier 71 including an optical amplifying unit 72 and an optical attenuator 70 connected to the input of the optical amplifying unit 72. In this case, the first and second wavelength characteristics of attenuation are set so as to cancel each other so that the wavelength characteristic of WDM light to be supplied to the optical amplifying unit 72 and amplified therein is not changed.

In each of the preferred embodiments shown in FIGS. 18B and 18C, the first and second wavelength characteristics of attenuation may be set so as to cancel the wavelength characteristic of gain in the optical amplifying unit 72.

Figure 19:
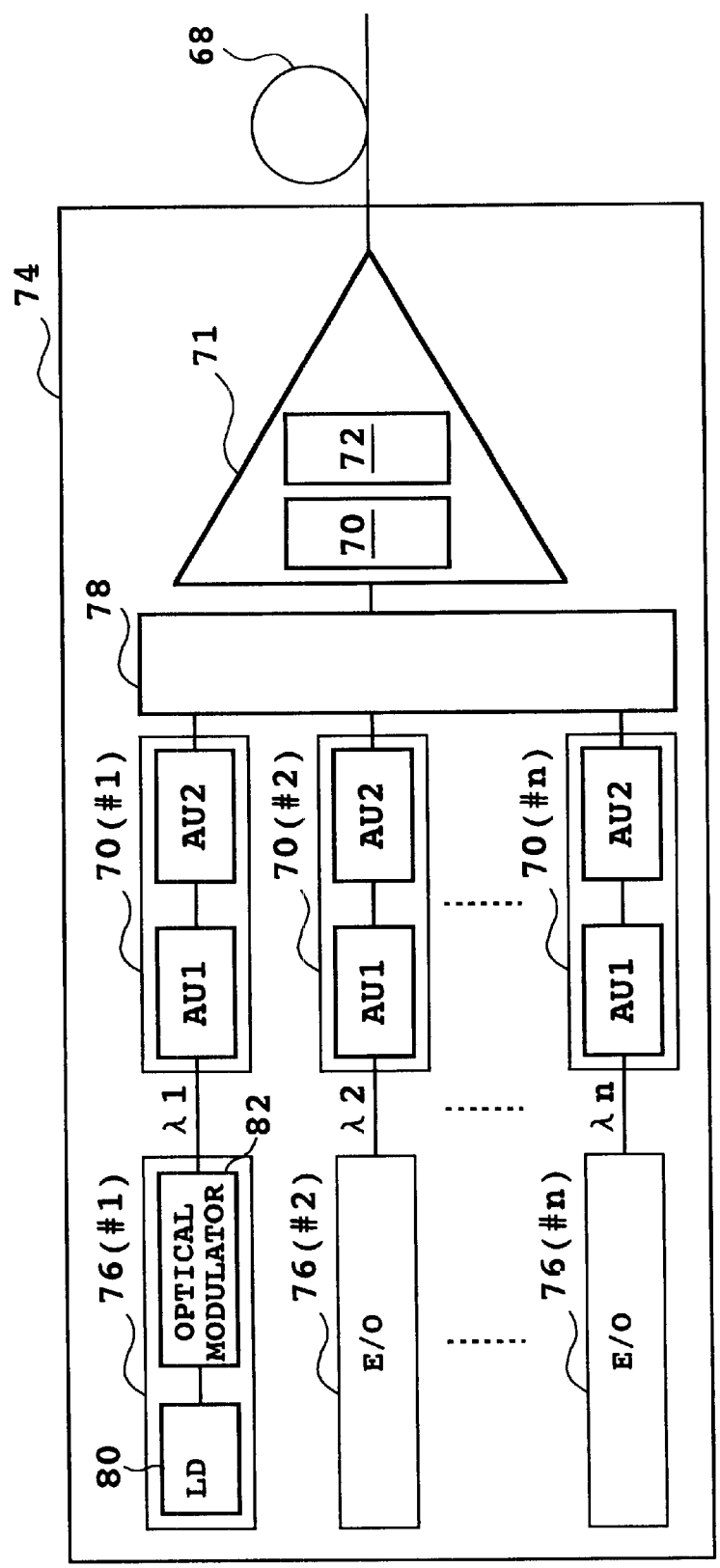
FIG. 19 is a block diagram showing a preferred embodiment of the terminal device according to the present invention.

FIG. 19 is a block diagram showing a preferred embodiment of the terminal device according to the present invention. A terminal device 74 is connected to an input end of an optical fiber transmission line 68. The terminal device 74 includes a plurality of E/O (electro/optic) converters 76 (#1 to #n) for outputting optical signals having different wavelengths $\lambda_1$ to $\lambda_n$, respectively, and a plurality of optical attenuators 70 (#1 to #n) according to the present invention for adjusting the levels of these optical signals output from the E/O converters 76 (#1 to #n), respectively. Each of the optical attenuators 70 (#1 to #n) is used as a so-called level adjusting unit. The optical signals output from the optical attenuators 70 (#1 to #n) are wavelength division multiplexed by an optical multiplexer 78 to obtain WDM light, which is in turn amplified by an optical amplifier 71 and next supplied to the optical fiber transmission line 68. Each of the preferred embodiments shown in FIGS. 18A, 18B, and 18C may be applied to the optical amplifier 71. Each of the E/O converters 76 (#1 to #n) includes a laser diode (LD) 80 for outputting CW light (continuous wave light) and an optical modulator 82 for modulating the CW light output from the LD 80 according to a main signal.

According to this preferred embodiment, in each of the optical attenuators 70 (#1 to #n), a substantially flat wavelength characteristic of attenuation or a desired wavelength characteristic of attenuation is obtained by application of the present invention. Accordingly, the wavelength characteristic of power of the optical signal output from each of the E/O converters 76 (#1 to #n) can be maintained to thereby maintain constant the wavelength characteristic of power of the WDM light obtained.

Further, the optical amplifier 71 has the optical attenuator 70 according to the present invention as a component. Accordingly, the wavelength characteristic of power of the WDM light obtained can be made flat or set to a desired characteristic.

The terminal device 74 may exclude the optical attenuators 70 (#1 to #n) or the optical amplifier 71.

As described above, according to the present invention, it is possible to provide an optical attenuator having a flat wavelength characteristic of attenuation or an adjustable wavelength characteristic of attenuation.

According to a specific preferred embodiment of the present invention, it is possible to provide a polarization-independent optical attenuator whose attenuation is not dependent on the polarization state of an input beam.

According to the present invention, it is possible to further provide a novel system, optical amplifier, and terminal device each having the optical attenuator according to the present invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical attenuator comprising:
   first and second attenuator units cascaded on an optical path; and
   a control circuit connected to said first and second attenuator units;
   each of said first and second attenuator units comprising a Faraday rotator provided on said optical path for generating a Faraday rotation angle given as a function of wavelength, and polarizing means for generating an attenuation determined by said Faraday rotation angle on said optical path;
   said control circuit including means for controlling said Faraday rotation angle in each of said first and second attenuator units so that a wavelength characteristic of attenuation in said first attenuator unit is substantially canceled by a wavelength characteristic of attenuation in said second attenuator unit.

2. An optical attenuator according to claim 1, wherein:
   said polarizing means of said first attenuator unit comprises first and second polarizers provided on said optical path so as to sandwich said Faraday rotator of said first attenuator unit; and
   said polarizing means of said second attenuator unit comprises third and fourth polarizers provided on said optical path so as to sandwich said Faraday rotator of said second attenuator unit;
   each of said first to fourth polarizers having an axis determining a polarization plane of polarized light passing therethrough.

3. An optical attenuator according to claim 2, wherein each of said Faraday rotators comprises a magneto-optic crystal provided so that said optical path passes therethrough and an electromagnet for applying a variable magnetic field according to a given current to said magneto-optic crystal.

4. An optical attenuator according to claim 3, wherein:
   said first attenuator unit is provided so that the attenuation by said first attenuator unit increases with an increase in said given current; and
   said second attenuator unit is provided so that the attenuation by said second attenuator unit decreases with an increase in said given current.

5. An optical attenuator according to claim 3, wherein:

the axes of said first and second polarizers are orthogonal to each other;

the axes of said third and fourth polarizers are parallel to each other;

the variable magnetic field applied by said electromagnet of each Faraday rotator is substantially perpendicular to said optical path; and each Faraday rotator further comprises a permanent magnet for applying a fixed magnetic field to said magneto-optic crystal so that when said given current is zero, said Faraday rotation angle becomes substantially 90°.

6. An optical attenuator according to claim 3, wherein:

the axes of said first and second polarizers are orthogonal to each other;

the axes of said third and fourth polarizers are orthogonal to each other;

the variable magnetic field applied by said electromagnet in said first attenuator unit is substantially perpendicular to said optical path;

said Faraday rotator of said first attenuator unit further comprises a permanent magnet for applying a fixed magnetic field to said magneto-optic crystal in said first attenuator unit so that when said given current is zero, said Faraday rotation angle becomes substantially 90°; and the variable magnetic field applied by said electromagnet in said second attenuator unit is substantially parallel to said optical path.

7. An optical attenuator according to claim 1, wherein:

said polarizing means of said first attenuator unit comprises first and second birefringent crystals provided so as to sandwich said Faraday rotator of said first attenuator unit; and said polarizing means of said second attenuator unit comprises third and fourth birefringent crystals provided so as to sandwich said Faraday rotator of said second attenuator unit;

said optical path being provided by an ordinary ray and an extraordinary ray defined in each of said first to fourth birefringent crystals;

said optical attenuator further comprising:

a first optical fiber for supplying light along said optical path; and a second optical fiber optically coupled to said first optical fiber with a coupling efficiency according to each Faraday rotation angle.

8. An optical attenuator according to claim 7, wherein each of said first to fourth birefringent crystals has a principal axis determining said ordinary ray and said extraordinary ray.

9. An optical attenuator according to claim 8, wherein each of said Faraday rotators comprises a magneto-optic crystal provided so that said optical path passes therethrough and an electromagnet for applying a variable magnetic field according to a given current to said magneto-optic crystal.

10. An optical attenuator according to claim 9, wherein:

said first attenuator unit is provided so that the attenuation by said first attenuator unit increases with an increase in said given current; and said second attenuator unit is provided so that the attenuation by said second attenuator unit decreases with an increase in said given current.

11. An optical attenuator according to claim 9, wherein:

the principal axes of said first and second birefringent crystals are orthogonal to each other;

the principal axes of said third and fourth birefringent crystals are parallel to each other;

the variable magnetic field applied by said electromagnet of each Faraday rotator is substantially perpendicular to said optical path; and each Faraday rotator further comprises a permanent magnet for applying a fixed magnetic field to said magneto-optic crystal so that when said given current is zero, said Faraday rotation angle becomes substantially 90°.

12. An optical attenuator according to claim 9, wherein:

the principal axes of said first and second birefringent crystals are orthogonal to each other;

the principal axes of said third and fourth birefringent crystals are orthogonal to each other;

the variable magnetic field applied by said electromagnet in said first attenuator unit is substantially perpendicular to said optical path;

said Faraday rotator of said first attenuator unit further comprises a permanent magnet for applying a fixed magnetic field to said magneto-optic crystal in said first attenuator unit so that when said given current is zero, said Faraday rotation angle becomes substantially 90°; and the variable magnetic field applied by said electromagnet in said second attenuator unit is substantially parallel to said optical path.

13. An optical attenuator according to claim 7, wherein:

each of said first and second birefringent crystals comprises a wedge plate having a wedge angle defined on a first plane; and each of said third and fourth birefringent crystals comprises a wedge plate having a wedge angle defined on a second plane.

14. An optical attenuator according to claim 13, wherein said first and second planes are not parallel to each other.

15. An optical attenuator according to claim 13, wherein:

said first and second planes are parallel to each other; and said optical attenuator further comprises a third optical fiber for optically connecting said first and second attenuator units.

16. An optical attenuator according to claim 1, wherein:

each of said Faraday rotators comprises a magneto-optic crystal provided so that said optical path passes therethrough, magnetic field applying means for applying first and second magnetic fields having different directions to said magneto-optic crystal, and magnetic field adjusting means for changing at least one of said first and second magnetic fields;

said first and second magnetic fields being set so that a synthetic magnetic field of said first and second magnetic fields has a strength enough to saturate magnetization of said magneto-optic crystal.

17. An optical attenuator according to claim 16, wherein the directions of said first and second magnetic fields are orthogonal to each other on a plane parallel to said optical path.

18. An optical attenuator according to claim 16, wherein:

said magnetic field applying means comprises an electromagnet and a permanent magnet for applying said first and second magnetic fields, respectively; and said magnetic field adjusting means adjusts a drive current for said electromagnet.

19. An optical attenuator according to claim 18, wherein the direction of said second magnetic field is substantially parallel to said optical path.

20. An optical attenuator according to claim 1, wherein said controlling means controls said Faraday rotation angle in each of said first and second attenuator units under the condition that said Faraday rotation angle in said first attenuator unit and said Faraday rotation angle in said second attenuator unit become substantially equal to each other.

21. An optical attenuator according to claim 1, wherein when the attenuation by said optical attenuator is relatively large, said controlling means controls said Faraday rotation angle in each of said first and second attenuator units under the condition that said Faraday rotation angle in said first attenuator unit and said Faraday rotation angle in said second attenuator unit become substantially equal to each other, whereas when the attenuation by said optical attenuator is relatively small, said controlling means controls each Faraday rotation angle under the condition that said Faraday rotation angle in said first attenuator unit and said Faraday rotation angle in said second attenuator unit become different from each other.

22. An optical attenuator comprising:
first and second attenuator units cascaded on an optical path; and
a control circuit connected to said first and second attenuator units;
each of said first and second attenuator units comprising a Faraday rotator provided on said optical path for generating a Faraday rotation angle given as a function of wavelength, and polarizing means for generating an attenuation determined by said Faraday rotation angle on said optical path;
said control circuit including means for controlling said Faraday rotation angle in each of said first and second attenuator units so that a wavelength characteristic given as the sum of a wavelength characteristic of attenuation in said first attenuator unit and a wavelength characteristic of attenuation in said second attenuator unit has a desired tilt.

23. An optical attenuator comprising:
first and second attenuator units each for giving a variable attenuation, said first and second attenuator units having first and second wavelength attenuation characteristics, respectively, which are different from each other, wherein,
said second wavelength characteristic of attenuation substantially cancels said first wavelength characteristic of attenuation.

24. An optical attenuator comprising:
first and second attenuator units each giving a variable attenuation and including an optical magnetic device and a polarizer;
wherein said second attenuator unit attenuates an output light of said first attenuator unit, and has second wavelength attenuation characteristics that cancel first wavelength attenuation characteristics of the first attenuator unit.

25. An optical device comprising:
an optical attenuator attenuating an input light and outputting an attenuated light;
a first attenuator unit giving a variable attenuation to the input light and being positioned on the input side of said optical attenuator; and
a second attenuator unit giving a variable attenuation to an output light of said first attenuator unit and being positioned on the output side of said optical attenuator, and having second wavelength attenuation characteristics that cancel first wavelength attenuation characteristics of the first attenuator unit.

26. An optical device according to claim 25,
wherein said first attenuator unit has a lens positioned on the input side of said optical attenuator; and
said second attenuator unit has a lens positioned on the output side of said optical attenuator.

27. An optical device comprising:
an optical attenuator attenuating an input light and outputting an attenuated light;
a first attenuator unit giving a variable attenuation to the input light and being positioned on the input side of said optical attenuator; and
a second attenuator unit attenuating an output light of said first attenuator unit and being positioned on the output side of said optical attenuator, and having second wavelength attenuation characteristics that cancel first wavelength attenuation characteristics of the first attenuator unit.

28. An optical device comprising:
an optical attenuator attenuating an input light and outputting an attenuated light;
a first attenuator unit attenuating the input light and being positioned on the input side of said optical attenuator; and
a second attenuator unit giving a variable attenuation to an output light of said first attenuator unit and being positioned on the output side of said optical attenuator, and having second wavelength attenuation characteristics that cancel first wavelength attenuation characteristics of the first attenuator unit.

29. An optical attenuator to attenuate light input from an input optical fiber, outputting an attenuated light to an output optical fiber, comprising:
first and second attenuator units each giving a variable attenuation and including an optical magnetic device and a polarizer;
wherein said first attenuator unit is connected the input optical fiber, said second attenuator unit is connected to the output optical fiber and attenuates an output light of said first attenuator unit, and said first attenuator unit is canceled by a wavelength attenuation characteristic in said second attenuator unit.

30. An optical device comprising:
an optical attenuator attenuating an input light from an input optical fiber and outputting an attenuated light to an output optical fiber;
a first attenuator unit, connected to the input optical fiber, giving a variable attenuation to the input light and being positioned on the input side of said optical attenuator; and
a second attenuator unit, connected to the output optical fiber, giving a variable attenuation to an output light of said first attenuator unit and being positioned on the output side of said optical attenuator, and having second wavelength attenuation characteristics that cancel first wavelength attenuation characteristics of the first attenuator unit.

31. An optical device according to claim 30,
wherein said first attenuator unit has a lens positioned on the input side of said optical attenuator; and said second attenuator unit has a lens positioned on the output side of said optical attenuator.

32. An optical device comprising:

an optical attenuator attenuating an input light from an input optical fiber and outputting an attenuated light to an output optical fiber;

a first attenuator unit, connected to the input optical fiber, giving a variable attenuation to the input light and being positioned on the input side of said optical attenuator; and a second attenuator unit, connected to the output optical fiber, attenuating an output light of said first attenuator unit and being positioned on the output side of said optical attenuator, and having second wavelength attenuation characteristics that cancel first wavelength attenuation characteristics of the first attenuator unit.

33. An optical device comprising:

an optical attenuator attenuating an input light from an input optical fiber and outputting an attenuated light to an output optical fiber;

a first attenuator unit, connected to the input optical fiber, attenuating the input light and being positioned on the input side of said optical attenuator; and a second attenuator unit, connected to the output optical fiber, giving a variable attenuation to an output light of said first attenuator unit and being positioned on the output side of said optical attenuator, and having second wavelength attenuation characteristics that cancel first wavelength attenuation characteristics of the first attenuator unit.

34. An apparatus comprising:

an input optical fiber and an output optical fiber;

a first attenuator unit, connected to the input optical fiber, variable attenuating a light provided from the input optical fiber, to thereby output a first attenuated light; and a second attenuator unit, connected to the output optical fiber, variably attenuating the first attenuated light, to thereby output a second attenuated light which is provided to the output optical fiber, and having second wavelength attenuation characteristics that cancel first wavelength attenuation characteristics of the first attenuator unit.

35. An apparatus comprising:

an input optical fiber and an output optical fiber;

a first attenuator unit, connected to the input optical fiber, variable attenuating a light provided from the input optical fiber, to thereby output a first attenuated light; and a second attenuator unit, connected to the output optical fiber, attenuating the first attenuated light, to thereby output a second attenuated light which is provided to the output optical fiber, and having second wavelength attenuation characteristics that cancel first wavelength attenuation characteristics of the first attenuator unit.

36. An apparatus comprising:

an input optical fiber and an output optical fiber;

a first attenuator unit, connected to the input optical fiber, attenuating a light provided from the input optical fiber, to thereby output a first attenuated light; and a second attenuator unit, connected to the output optical fiber, variably attenuating the first attenuated light, to thereby output a second attenuated light which is provided to the output optical fiber, and having second wavelength attenuation characteristics that cancel first wavelength attenuation characteristics of the first attenuator unit.

* * * * *